US007285350B2

(12) United States Patent
Keefer et al.

(10) Patent No.: US 7,285,350 B2
(45) Date of Patent: Oct. 23, 2007

(54) ENHANCED SOLID OXIDE FUEL CELL SYSTEMS

(75) Inventors: Bowie G. Keefer, Galiano Island (CA); Matthew L. Babicki, West Vancouver (CA); Mark H. Kirby, North Vancouver (CA)

(73) Assignee: QuestAir Technologies Inc., Burnaby, British Columbia (CA)

( * ) Notice: Subject to any disclaimer, the term of this patent is extended or adjusted under 35 U.S.C. 154(b) by 580 days.

(21) Appl. No.: 10/671,750

(22) Filed: Sep. 26, 2003

(65) Prior Publication Data
US 2004/0131912 A1 Jul. 8, 2004

Related U.S. Application Data

(60) Provisional application No. 60/500,532, filed on Sep. 5, 2003, provisional application No. 60/472,036, filed on May 19, 2003, provisional application No. 60/414,607, filed on Sep. 27, 2002.

(51) Int. Cl.
*H01M 2/00* (2006.01)
*H01M 8/02* (2006.01)
*H01M 8/12* (2006.01)
*H01M 2/14* (2006.01)
*H01M 8/04* (2006.01)

(52) U.S. Cl. .............. 429/34; 429/30; 429/38; 429/20; 429/17; 429/19; 429/21

(58) Field of Classification Search ............ 429/34, 429/30, 38, 20, 17, 19, 21
See application file for complete search history.

(56) References Cited

U.S. PATENT DOCUMENTS 3,094,569 A 6/1963 Thomas
3,204,388 A 9/1965 Asker
3,430,418 A 3/1969 Wagner
3,513,631 A 5/1970 Siebert et al.
3,564,816 A 2/1971 Batta (Continued)

FOREIGN PATENT DOCUMENTS

CA 1256038 6/1989

(Continued)

OTHER PUBLICATIONS

Carvill et al., *AIChE J.* 42(10):2765-2772, 1996.

(Continued)

*Primary Examiner*—Dah Wei Yuan
*Assistant Examiner*—Angela J. Martin
(74) *Attorney, Agent, or Firm*—Klarquist Sparkman, LLP

(57) ABSTRACT

Enhanced high temperature fuel cell systems, such as solid oxide fuel cell systems and molten carbonate fuel cell systems are disclosed. Embodiments of the disclosure include solid oxide and molten carbonate fuel cell systems incorporating gas separation apparati facilitating the recycle of hydrogen fuel from fuel cell anode exhaust for supply to the fuel cell anode inlet. Further embodiments of the disclosure include solid oxide and molten carbonate fuel cell systems incorporating inventive combinations of anode materials conducive to combination with enriched hydrogen fuel. Other embodiments of the disclosure include gas separation apparati for providing enriched oxygen feed to the cathode inlet of solid oxide and molten carbonate fuel cells.

8 Claims, 27 Drawing Sheets

U.S. PATENT DOCUMENTS

| | | | |
|---|---|---|---|
| 3,594,984 | A | 7/1971 | Toyama et al. |
| 3,847,672 | A | 11/1974 | Trocciola et al. |
| 3,865,924 | A | 2/1975 | Gidaspow et al. |
| 4,019,879 | A | 4/1977 | Rabo et al. |
| 4,144,037 | A | 3/1979 | Armond et al. |
| 4,153,434 | A | 5/1979 | Settlemyer |
| 4,200,682 | A | 4/1980 | Sederquist |
| 4,272,265 | A | 6/1981 | Snyder |
| 4,322,394 | A | 3/1982 | Mezey et al. |
| 4,354,859 | A | 10/1982 | Keller et al. |
| 4,406,675 | A | 9/1983 | Dangieri et al. |
| 4,452,612 | A | 6/1984 | Mattia |
| 4,530,705 | A | 7/1985 | Firey |
| 4,532,192 | A | 7/1985 | Baker et al. |
| 4,553,981 | A | 11/1985 | Fuderer |
| 4,555,453 | A | 11/1985 | Appleby |
| 4,578,214 | A | 3/1986 | Jungerhans |
| 4,587,114 | A | 5/1986 | Hirai et al. |
| 4,595,642 | A | 6/1986 | Nakanishi et al. |
| 4,696,682 | A | 9/1987 | Hirai et al. |
| 4,702,903 | A | 10/1987 | Keefer |
| 4,726,816 | A | 2/1988 | Fuderer |
| 4,743,276 | A | 5/1988 | Nishida et al. |
| 4,758,253 | A | 7/1988 | Davidson et al. |
| 4,759,997 | A | 7/1988 | Ohyauchi et al. |
| 4,781,735 | A | 11/1988 | Tagawa |
| 4,783,433 | A | 11/1988 | Tajima et al. |
| 4,790,858 | A | 12/1988 | Sircar |
| 4,801,308 | A | 1/1989 | Keefer |
| 4,816,121 | A | 3/1989 | Keefer |
| 4,914,076 | A | 4/1990 | Tsuji et al. |
| 4,917,711 | A | 4/1990 | Xie et al. |
| 4,963,339 | A | 10/1990 | Krishnamurthy et al. |
| 4,968,329 | A | 11/1990 | Keefer |
| 4,969,935 | A | 11/1990 | Hay |
| 4,988,580 | A | 1/1991 | Ohsaki et al. |
| 4,994,331 | A | 2/1991 | Cohen |
| 5,068,159 | A | 11/1991 | Kinoshita |
| 5,079,103 | A | 1/1992 | Schramm |
| 5,082,473 | A | 1/1992 | Keefer |
| 5,096,469 | A | 3/1992 | Keefer |
| 5,096,470 | A | 3/1992 | Krishnamurthy |
| 5,126,310 | A | 6/1992 | Golden et al. |
| 5,133,784 | A | 7/1992 | Boudet et al. |
| 5,147,735 | A | 9/1992 | Ippommatsu et al. |
| 5,175,061 | A | 12/1992 | Hildebrandt et al. |
| 5,217,916 | A | 6/1993 | Anderson et al. |
| 5,227,598 | A | 7/1993 | Woodmansee et al. |
| 5,245,110 | A | 9/1993 | Van Dijk et al. |
| 5,246,676 | A | 9/1993 | Hay |
| 5,248,325 | A | 9/1993 | Kagimoto et al. |
| 5,256,172 | A | 10/1993 | Keefer |
| 5,256,174 | A | 10/1993 | Kai et al. |
| 5,258,571 | A | 11/1993 | Golden et al. |
| 5,271,916 | A | 12/1993 | Vandenborgh et al. |
| 5,282,886 | A | 2/1994 | Kabayashi et al. |
| 5,328,503 | A | 7/1994 | Kumar |
| 5,360,679 | A | 11/1994 | Buswell et al. |
| 5,366,818 | A | 11/1994 | Wilkinson et al. |
| 5,393,326 | A | 2/1995 | Engler et al. |
| 5,411,578 | A | 5/1995 | Watson et al. |
| 5,415,748 | A | 5/1995 | Emiliani et al. |
| 5,429,665 | A | 7/1995 | Botich |
| 5,431,716 | A | 7/1995 | Ebbeson |
| 5,434,016 | A | 7/1995 | Benz et al. |
| 5,441,559 | A | 8/1995 | Petit et al. |
| 5,487,775 | A | 1/1996 | LaCava et al. |
| 5,509,956 | A | 4/1996 | Opperman et al. |
| 5,523,326 | A | 6/1996 | Dandekar et al. |
| 5,529,763 | A | 6/1996 | Peng et al. |
| 5,529,970 | A | 6/1996 | Peng |
| 5,531,809 | A | 7/1996 | Golden et al. |
| 5,543,238 | A | 8/1996 | Strasser |
| 5,593,478 | A | 1/1997 | Hill et al. |
| 5,604,047 | A | 2/1997 | Bellows et al. |
| 5,632,807 | A | 5/1997 | Tomita et al. |
| 5,645,950 | A | 7/1997 | Benz et al. |
| 5,646,305 | A | 7/1997 | Wagner et al. |
| 5,656,067 | A | 8/1997 | Watson et al. |
| 5,658,370 | A | 8/1997 | Vigor et al. |
| 5,711,926 | A | 1/1998 | Knaebel |
| 5,714,276 | A | 2/1998 | Okamoto |
| 5,766,311 | A | 6/1998 | Ackley et al. |
| 5,811,201 | A | 9/1998 | Skowronski |
| 5,827,358 | A | 10/1998 | Kulish et al. |
| 5,876,486 | A | 3/1999 | Steinwandel et al. |
| 5,891,217 | A | 4/1999 | Lemcoff et al. |
| 5,900,329 | A | 5/1999 | Reiter et al. |
| 5,917,136 | A | 6/1999 | Gaffney et al. |
| 5,925,322 | A | 7/1999 | Werth |
| 5,955,039 | A | 9/1999 | Dowdy |
| 5,958,109 | A | 9/1999 | Fuderer |
| 5,968,680 | A | 10/1999 | Wolfe et al. |
| 5,980,857 | A | 11/1999 | Kapoor et al. |
| 5,981,096 | A | 11/1999 | Hornberg et al. |
| 5,998,056 | A | 12/1999 | Divisek et al. |
| 6,022,399 | A | 2/2000 | Ertl et al. |
| 6,045,933 | A | 4/2000 | Okamoto |
| 6,051,050 | A | 4/2000 | Keefer et al. |
| 6,056,804 | A | 5/2000 | Keefer et al. |
| 6,060,032 | A | 5/2000 | Hable et al. |
| 6,063,161 | A | 5/2000 | Keefer et al. |
| 6,077,620 | A | 6/2000 | Pettit |
| 6,090,312 | A | 7/2000 | Ziaka et al. |
| 6,143,057 | A | 11/2000 | Bülow et al. |
| 6,162,558 | A | 12/2000 | Borup et al. |
| 6,176,897 | B1 | 1/2001 | Keefer |
| 6,190,623 | B1 | 2/2001 | Sanger et al. |
| 6,190,791 | B1 | 2/2001 | Hornburg |
| 6,200,365 | B1 | 3/2001 | Eimer et al. |
| 6,210,822 | B1 | 4/2001 | Abersfelder et al. |
| 6,231,644 | B1 | 5/2001 | Jain et al. |
| 6,255,010 | B1 | 7/2001 | George et al. |
| 6,283,723 | B1 | 9/2001 | Milburn et al. |
| 6,293,998 | B1 | 9/2001 | Dolan et al. |
| 6,296,823 | B1 | 10/2001 | Ertl et al. |
| 6,312,843 | B1 | 11/2001 | Kimbara et al. |
| 6,358,300 | B1 | 3/2002 | Fornof et al. |
| 6,398,853 | B1 | 6/2002 | Keefer et al. |
| 6,406,523 | B1 | 6/2002 | Connor et al. |
| 6,428,915 | B1 | 8/2002 | Ban et al. |
| 6,517,609 | B1 | 2/2003 | Monereau et al. |
| 6,607,854 | B1 | 8/2003 | Rehg et al. |
| 6,653,005 | B1 * | 11/2003 | Muradov ............... 429/19 |
| 6,667,128 | B2 | 12/2003 | Edlund |
| 6,692,545 | B2 | 2/2004 | Gittleman et al. |
| 7,087,331 | B2 * | 8/2006 | Keefer et al. ............ 429/17 |
| 2001/0047824 | A1 | 12/2001 | Hill et al. |
| 2002/0004157 | A1 | 1/2002 | Keefer et al. |
| 2002/0098394 | A1 | 7/2002 | Keefer et al. |
| 2002/0104518 | A1 | 8/2002 | Keefer et al. |
| 2002/0110503 | A1 | 8/2002 | Gittleman et al. |
| 2002/0110504 | A1 | 8/2002 | Gittleman et al. |
| 2002/0112479 | A1 | 8/2002 | Keefer et al. |
| 2002/0127442 | A1 | 9/2002 | Connor et al. |
| 2002/0142198 | A1 | 10/2002 | Towler et al. |
| 2002/0142208 | A1 | 10/2002 | Keefer et al. |
| 2003/0143448 | A1 | 7/2003 | Keefer |
| 2003/0157390 | A1 | 8/2003 | Keefer et al. |
| 2004/0005492 | A1 | 1/2004 | Keefer et al. |

FOREIGN PATENT DOCUMENTS

| | | |
|---|---|---|
| CA | 2016045 | 8/1994 |

| | | | | | | |
|---|---|---|---|---|---|---|
| CA | 2087972 | 1/2000 | | JP | 11 214021 A2 | 8/1999 |
| CA | 2087973 | 1/2000 | | WO | WO94/04249 | 8/1992 |
| CA | 2109055 | 2/2000 | | WO | WO96/13871 | 5/1996 |
| CA | 2 325 072 | 4/2002 | | WO | WO98/29182 | 9/1998 |
| DE | 3913581 A1 | 11/1990 | | WO | WO99/01202 | 1/1999 |
| EP | 0 143 537 A2 | 6/1985 | | WO | WO99/19249 | 4/1999 |
| EP | 0 341 189 A1 | 8/1989 | | WO | WO99/28013 | 6/1999 |
| EP | 0 345 908 | 12/1989 | | WO | WO99/46032 | 9/1999 |
| EP | 0 143 537 B1 | 3/1990 | | WO | WO 00/16425 | 3/2000 |
| EP | 0 681 860 A2 | 7/1996 | | WO | WO 00/16880 | 3/2000 |
| EP | 0 691 701 A1 | 10/1996 | | WO | WO 00/76630 | 12/2000 |
| EP | 0 737 648 A | 10/1996 | | WO | WO 01/47050 | 6/2001 |
| EP | 0 750 361 A | 12/1996 | | WO | WO 02/24309 | 3/2002 |
| EP | 0 751 045 | 1/1997 | | WO | WO 02/35623 | 5/2002 |
| EP | 0 853 967 | 7/1998 | | WO | WO 02/37590 | 5/2002 |
| EP | 1 095 689 A1 | 10/1999 | | WO | WO 02/45821 | 6/2002 |
| EP | 1 070 531 A2 | 1/2001 | | WO | WO 02/47797 | 6/2002 |
| EP | 1 172 772 | 1/2001 | | WO | WO 02/056400 | 7/2002 |
| GB | 2 042 365 | 9/1980 | | WO | WO 2004/030130 | 4/2004 |
| JP | 59075574 A | 4/1974 | | | | |
| JP | 62274561 | 11/1978 | | | | |
| JP | 62 278770 | 3/1987 | | | | |
| JP | 63 166137 | 11/1987 | | | | |
| JP | 62278770 | 12/1987 | | | | |
| JP | 63166157 | 7/1988 | | | | |
| JP | 63 228572 A | 9/1988 | | | | |
| JP | 04206161 A | 7/1992 | | | | |
| JP | 05 166528 | 7/1993 | | | | |
| JP | 5166528 A | 10/1993 | | | | |
| JP | 07 094200 | 7/1995 | | | | |
| JP | 80 45526 A2 | 2/1996 | | | | |
| JP | 10 027621 A | 1/1998 | | | | |
| JP | 63034862 | 2/1998 | | | | |
| JP | 10325360 A | 12/1998 | | | | |

OTHER PUBLICATIONS

Chatsiriwech et al., *Catalysis Today* 20:351-366, 1994.
Ding et al., *Chemical Engineering Science* 55:3461-3474, 2000.
Ding et al., *Chemical Engineering Science* 55:3929-3940, 2000.
Hufton et al., *AIChE J.* 45(2):248-256, 1999.
Iyuke et al., *Chemical Engineering Science* 55:4745-4755, 2000.
Vaporciyan and Kadiec, *AIChE J.* 35:831-844, 1989.
International Search Report from International Application No. PCT/CA99/00823.
International Search Report from International Application No. PCT/CA02/00368.

* cited by examiner

ENHANCED SOLID OXIDE FUEL CELL SYSTEMS

CROSS REFERENCE TO RELATED APPLICATION

Priority

This application claims priority to U.S. Provisional Application No. 60/414,607 filed Sep. 27, 2002, U.S. Provisional Application No. 60/472,036 filed May 19, 2003, and U.S. Provisional Application No. 60/500,532 filed Sep. 5, 2003, all of which are incorporated herein by reference.

FIELD

This application is related to high temperature fuel cell systems, such as solid oxide fuel cell systems, particularly in combination with gas separation apparati, and QuestAir Technologies' related copending patent applications, including U.S. patent application Ser. Nos. 09/591,275, 09/808,715, 10/039,940, and 10/352,361, the disclosures of which in their entirety are incorporated herein by reference.

BACKGROUND

Fuel cells provide an environmentally friendly source of electrical current. One type of high temperature fuel cell (HTFC) used for generating electrical power is the solid oxide fuel cell (SOFC). The SOFC includes an anode channel for receiving a flow of fuel gas, a cathode channel for receiving a flow of oxygen gas, and a solid electrolyte which is a ceramic membrane conductive to oxygen ions and separates the anode channel from the cathode channel. Oxygen in the cathode channel dissociates to oxygen ions, which cross the electrolyte to react with hydrogen in the anode channel to generate a flow of electrons. While hydrogen is a preferred fuel gas for efficient SOFC operation, the fuel gas may be a hydrocarbon which reacts in the anode channel either by direct oxidation or to generate hydrogen by steam reforming and water gas shift reactions. As hydrogen is consumed, carbon monoxide may be oxidized directly or may be shifted by steam to generate additional hydrogen. Carbon dioxide and water vapor are produced in the anode channel by oxidation of fuel components. Typical operating temperature of solid oxide fuel cells is about 500° to about 1000° C.

Another type of high temperature fuel cell used for generating electrical power, particularly envisaged for larger scale stationary power generation, is the molten carbonate fuel cell (MCFC). The MCFC includes an anode channel for receiving a flow of hydrogen gas (or a fuel gas which reacts in the anode channel to generate hydrogen by steam reforming and water gas shift reactions), a cathode channel for receiving a flow of oxygen gas, and a porous matrix containing a molten carbonate electrolyte which separates the anode channel from the cathode channel. Oxygen and carbon dioxide in the cathode channel react to form carbonate ions, which cross the electrolyte to react with hydrogen in the anode channel to generate a flow of electrons. As the hydrogen is consumed, carbon monoxide is shifted by steam to generate additional hydrogen. Carbon dioxide and water vapor are produced in the anode channel by oxidation of fuel components, and by reduction of carbonate ions from the electrolyte. Typical operating temperature of molten carbonate fuel cells is about 650° C.

For stationary power generation, hydrogen may be generated from natural gas by steam reforming or partial oxidation, and particularly by direct internal reforming within the anode channel, to produce "syngas" comprising a mixture of hydrogen, carbon monoxide, carbon dioxide, steam and some unreacted methane. As hydrogen is consumed in the fuel cell anode channel, much of the carbon monoxide reacts with steam by water gas shift to generate more hydrogen and more carbon dioxide. Other carbonaceous feedstocks (e.g. heavier hydrocarbons, coal, or biomass) may also be reacted with oxygen and steam to generate syngas by partial oxidation, gasification or autothermal reforming.

While the fuel cell may be operated on hydrogen or syngas that has been generated externally from a fossil fuel, efficient thermal integration between a high temperature fuel cell and an external fuel processing system may be difficult to achieve, since the fuel cell stack generates excess heat remote from the endothermic heat demand of fuel processing.

In order to achieve benefits of simplicity and better thermal integration, most SOFC developments for natural gas as the hydrocarbon fuel have contemplated internal reforming, in which the steam methane reforming reaction is conducted within the anode channel. A conventional SOFC anode material is nickel cermet with yttria stabilized zirconia (Ni-YSZ), which is an active catalyst for steam methane reforming. However, the nickel cermet is also catalytic for carbon deposition which must be avoided, typically by operating with a sufficiently high steam/carbon ratio with the adverse consequence that the excess steam degrades the SOFC voltage output. Under typical SOFC operating conditions, the steam reforming reaction will be substantially complete within about the first 20% of the anode channel, resulting in excessive cooling of that zone, which degrades performance and causes thermal stresses that may damage the SOFC stack. To ameliorate these problems, it is standard practice to include a pre-reformer which may achieve about 30% conversion of the steam reforming reaction upstream of the anode channel entrance. The pre-reformer also reduces the risk of carbon deposition within the anode, by accelerated reforming or methanation of the more reactive higher hydrocarbon components. The pre-reformer may be an externally heated steam reformer or an autothermal reformer based on partial oxidation.

Further simplification could be achieved if the hydrocarbon fuel could be oxidized directly within the SOFC anode channel, without addition of steam. Thus, Barnett et al (U.S. Pat. No. 6,214,485 B1) have used a nickel yttria doped ceria (Ni/YDC) cermet anode without carbon deposition on methane at temperatures below 800° C. Gorte et al (U.S. Patent Application Publication US 2001/0053471 A1) have used copper ceria over porous yttria stabilized zirconia cermets (Cu/CeO2/YSZ) to demonstrate operation on a range of hydrocarbon fuels without carbon deposition. H. Kim et al (J. Electrochem. Soc. 149, p. A247, 2002) used copper-nickel alloy ceria cermets for direct SOFC oxidation of methane. Lawless (U.S. Pat. No. 6,372,375) has proposed the use of copper cermets with niobia stabilized bismuth oxide.

Numerous other SOFC anode materials have been considered for direct oxidation of methane, for example cerium-modified lanthanum doped strontium titanate (La,Sr)/(Ti,Ce)$O_3$ by O. A. Marina and L. R. Pederson, Proceedings Fifth European Solid Oxide Fuel Cell Forum, p. 481, 2002; copper gadolinium doped ceria (Cu/CGO) by M. Joerger et al, Proceedings Fifth European Solid Oxide Fuel Cell Forum, p. 475, 2002 and by E. Ramirez-Cabrera et al, Proceedings Fifth European Solid Oxide Fuel Cell Forum, p. 531, 2002; nickel gadolinium doped ceria (Ni-CGO) by M. Ihara et al, Proceedings Fifth European Solid Oxide Fuel Cell Forum, p. 523, 2002; and modified lanthanum chromites ($LaCrO_3$, substituted by other lanthanides, and by Ca, Sr, Mg, Mn, Fe, Co, Ni, Cu or Nb) by J. Sfeir et al, Proceedings Fifth European Solid Oxide Fuel Cell Forum, p. 570, 2002 and E. Ramirez-Cabrera et al, Proceedings Fifth European Solid Oxide Fuel Cell Forum, p. 546, 2002.

While the above developments of advanced SOFC anode materials can enable direct oxidation of dry methane and some other hydrocarbons, the anode catalytic activity for hydrocarbons is much inferior to that for hydrogen. Hence, severe anode over-voltages for direct oxidation of hydrocarbons are typical, and higher performance (least activation polarization) would always be expected with hydrogen. It is noteworthy that activity of a Cu-ceria-YSZ cermet (R. Gorte et al, Adv. Mater. 2000, 12, p. 1465, 2000) increases in the order of methane<butane<hydrogen, indicating that the LPG components of natural gas should be oxidized more readily than methane, as expected owing to their greater reactivity than the more stable methane molecule.

The lower heat of combustion of a fuel usefully defines the energy (enthalpy change of the reaction) that may be generated by oxidizing that fuel. The electrochemical energy that can be generated by an ideal fuel cell is however the free energy change of the reaction, which is smaller than the enthalpy change. The difference between the enthalpy change and the free energy change is the product of the entropy change of the reaction multiplied by the absolute temperature. This difference widens at higher temperatures, so higher temperature fuel cells inherently convert a lower fraction of the fuel energy to electrical power at high efficiency, while a larger fraction of the fuel energy is available only as heat which must be converted to electrical power by a thermodynamic bottoming cycle (e.g. steam or gas turbine plant) at lower efficiency.

For both SOFCs and MCFCs, accumulation of reaction products (carbon dioxide and steam) on the fuel cell anode opposes the electrochemical reaction, so that the free energy is reduced. Higher partial pressure of oxygen over the cathode, and higher partial pressure of hydrogen over the anode, drive the reaction forward so that the free energy is increased. Unfortunately, the reaction depletes the oxygen in the cathode channel and depletes hydrogen in the anode channel while rapidly increasing the backpressure of carbon dioxide as a diluent in the anode channel. Hence the free energy change is reduced, directly reducing the cell voltage of the fuel stack. This degrades the electrical efficiency of the system, while increasing the heat that must be converted at already lower efficiency by the thermal bottoming cycle.

The free energy change is simply the product of the electromotive force ("E") of the cell and the charge transferred per mole by the reaction ("2F"), where the factor of two reflects the valency of the oxygen ion. The following Nernst relation for a SOFC expresses the above described sensitivity of the electromotive force (open circuit voltage, or Gibbs free energy expressed as electron-volts per electron) to the partial pressures of the electrochemical reactants in the anode and cathode channels, where the standard electromotive force ("Eo") is referred to all components at standard conditions and with water as vapor.

$$E = E_o - \frac{RT}{2F}\ln\left[\frac{P_{H2O(anode)}}{P_{H2(anode)} \cdot P^{0.5}_{O2(cathode)}}\right]$$

The same sensitivity to partial pressures of reactants in MCFCs is expressed by the following Nernst relation for a MCFC $$E = E_o - \frac{RT}{2F}\ln\left[\frac{P_{H2O(anode)} \cdot P_{CO2(anode)}}{P_{H2(anode)} \cdot P^{0.5}_{O2(cathode)} \cdot P_{CO2(cathode)}}\right]$$

The open circuit voltage is elevated by a high ratio of hydrogen to steam over the anode, and by increased partial pressure of oxygen over the cathode. At finite working current density, the operating voltage is determined by subtracting ohmic resistance losses, activation polarization and concentration polarization from the open circuit voltage.

Prior art MCFC systems do not provide any satisfactory solution for this problem which gravely compromises attainable overall efficiency. Despite repeated attempts to devise an effective technology and method to maximize reactant concentrations, and minimize product accumulation in both the anode and cathode circuits that would be compatible with MCFC operating conditions, no such attempt has been adequately successful.

The accepted method for supplying carbon dioxide to the MCFC cathode has been to burn a fraction of the anode exhaust gas (including unreacted hydrogen and other fuel components) to provide carbon dioxide mixed with steam and nitrogen to be mixed with additional air providing oxygen to the cathode. This approach has serious limitations. Even more of the original fuel value is unavailable for relatively efficient electrochemical power generation, in view of additional combustion whose heat can only be absorbed usefully by the thermal bottoming cycle. Also, the oxygen/nitrogen ratio of the cathode gas is even more dilute than ambient air, further reducing cell voltage and hence transferring more power generation load less efficiently onto the thermal bottoming plant.

A further shortcoming of high temperature fuel cell power plant systems known in the prior art is the inability of such previously known systems to provide means for effective mitigation of "greenhouse" gas and other environmentally deleterious gas emissions resulting from fossil-fuel derived power generation.

SUMMARY

The disclosed embodiments provide MCFC or SOFC based generation systems which address some of the deficiencies of the prior art. In one example, the MCFC or SOFC generation systems are adapted to manipulate reactant concentrations for enhanced performance and economics, with MCFC systems being more particularly adapted to efficiently transfer carbon dioxide from the anode to the cathode while enhancing electrical power output. Another example provides MCFC and SOFC electrical generation systems adapted to enable selective generation of electrical power, and/or hydrogen fuel, and/or useable heat, allowing flexible operation of the generation system while incorporating means for mitigation of "greenhouse" gas and other environmentally deleterious gas emissions, and enhancing overall efficiency of operation to increase sustainability of fuel resource use.

In one aspect, several examples of the disclosed embodiments address some of the inefficiencies of SOFC electrical current generation systems discussed above by taking into account the fact that anode activation polarization and the more important cathode activation polarization are reduced by elevated partial pressures of respectively hydrogen and oxygen and providing means for advantageously exploiting these principles of SOFC operation. Oxygen enrichment reduces concentration polarization on the cathode side, so that much higher operating current densities may be achieved, particularly with cathode-supported SOFC cells.

According to an example of the disclosed embodiments, gas separation systems may be applied for manipulating partial pressures of reactants in the fuel cell, so as to achieve higher voltage E by elevating the partial pressure of hydrogen over the anode and/or elevating the partial pressure of oxygen (for SOFCs) or carbon dioxide (for MCFCs) over the cathode. Suitable such gas separation systems may include membrane permeation systems, physical or chemical absorbent systems, or regenerable adsorbent systems which may be regenerated by sweep or displacement purge, cyclic pressure, or cyclic temperature means, as are described in detail in the Applicant's copending U.S. patent application Ser. No. 10/389,541, the contents of which in its entirety are herein incorporated by reference.

A more particular example is a SOFC system having an anode channel with an inlet and an outlet, and a cathode channel with an inlet and an outlet, the anode and cathode channels being separated by a solid electrolyte conductive to oxygen ions. The solid electrolyte is layered with electrode materials, on one side with an anode material contacting the anode channel, and on the opposite side with a cathode material contacting the cathode channel. The SOFC system has a first anode portion adjacent the anode inlet, and a second anode portion adjacent the anode outlet; and in general any number of intermediate anode portion(s) along the anode channel between the first and second anode portions.

The SOFC system may comprise a single SOFC stage, or it may comprise a plurality of stages (e.g. a "network") in series along the anode channel between the anode inlet and outlet. Each SOFC stage may have a single SOFC cell of tubular or planar or other configuration, or multiple cells receiving the anode and cathode flows in parallel while electrically connected in series. The SOFC cells may be segmented (e.g. in a segmented tubular configuration) so as to receive the anode and cathode flows in series, while also electrically connected in series. The first, second and any intermediate anode portions may be provided with two or more anode portions as zones of the anode of a single SOFC stage, or each anode portion may be the anode of a single SOFC stage or segment.

In a first variant hydrogen is recovered from the anode exhaust gas of a SOFC system by means of a gas separation system, with the recovered hydrogen enriched by at least partial removal of water vapour and carbon dioxide, and the said enriched hydrogen is recycled to the anode inlet either directly or after processing in a pre-reformer with supplemental fuel. The anode exhaust gas received from the anode outlet may be subjected to water gas shift reaction, optionally with added steam, before separation of hydrogen to be recycled. Carbon dioxide may be removed by adsorption, and water vapour may be removed by condensation.

The electromotive force along the anode channel is enhanced by hydrogen recycle with direct internal reforming. Methane and CO are consumed by the internal reforming and water gas shift reactions as hydrogen is converted into steam, thus generating more hydrogen while consuming a fraction of the steam, so that the electromotive force obtained with a mixture of methane and recycled hydrogen fuel may unexpectedly be much higher than could be achieved with dry hydrogen (without any methane) as the fuel. The back-pressure of recycled hydrogen delays the steam reforming reaction along the anode channel to improve the heat load distribution.

While increasing the electromotive force, hydrogen recycle also enables operation with much higher electrochemical fuel utilization. Typical fuel utilization of internal reforming SOFC is about 85%, to avoid steep decline of the electromotive force with the rising ratio of steam to hydrogen.

In a second variant, which may be applied with or without the first variant, distinct anode materials may be used for first and second portions of the fuel cell anode. In the first anode portion, the anode material may be selected to be non-catalytic to carbon deposition, preferably in the absence or near absence of water vapour. The object is to achieve safety against carbon deposition, while avoiding the conventional need for excess steam at the inlet that would penalize the electromotive force. Suitable anode materials for the first anode portion include materials which are effective for direct oxidation of dry hydrocarbons without carbon deposition, with potentially suitable materials including but not limited to $Cu/CeO2/YSZ$, Cu-GDC, $Cu/Bi_2O_3$, $(La,Sr)(Ti,Ce)O_3$, and mixtures thereof. Suitable anode materials for the second anode portion include those which are active for steam reforming of hydrocarbons, for example Ni/YSZ, Ni/YDC, or Ni-GDC. Suitable anode materials for intermediate anode portions would be resistant to carbon deposition in the presence of modest steam concentrations, and may be moderately active for steam reforming, and may include for example $Cu$—$Ni/CeO2/YSZ$, $Cu$—$Ni/GDC$, modified $LaCrO_3$, or $(La,Sr)(Ti,Ce)O_3$. Intermediate between the first and second anode portions, the anode materials may be graded discretely or continuously between materials more effective for direct oxidation and those more active for steam reforming, so that the steam concentration may be as low as possible at the anode inlet and steam reforming of the fuel is achieved with rising steam concentrations toward the anode outlet, with carbon deposition avoided on all anode portions. In a particular embodiment of this second variant, the steam ratio may be desirably maintained at or below about 1.5 moles of steam/mole of carbon in the fuel during normal operation of the fuel cell. By contrast, in fuel cell systems of the prior art, substantially higher (such as 5 moles steam/mole carbon for example) concentrations of steam are used in order to avoid carbon deposition with conventional anode materials, and/or in systems without the benefit of enriched hydrogen recycle.

The second anode portion and any intermediate anode portions may alternatively use the same or a similar anode material as used in the first anode portion, but with a steam reforming catalyst adjacent the anode material and contacting the anode channel in the second anode portion. Intermediate between the first and second anode portions, the steam reforming catalyst loading and/or activity may be graded discretely or continuously so that steam reforming of the fuel may be performed with rising steam concentrations toward the anode outlet, with carbon deposition avoided on all anode portions. In a further alternative, a single material which is at least moderately resistant to carbon deposition and also at least moderately active for steam reforming may be used for both the first and second anode portions.

Although not bound by any theory, it is believed that the principles of the combined first and second variants include (1) low steam concentration while hydrogen concentration is elevated over the first portion of the anode so as to minimize polarization voltage losses and maximize voltage efficiency in the first anode portion, (2) rising steam concentration with hydrogen oxidation along the anode channel provides an adequate steam/carbon ratio for steam reforming over the second anode portion, and (3) catalytic activity for steam reforming and the availability of steam are delayed until the latter portion of the anode channel, so as to achieve an improved thermal balance, reduced thermal stresses, and greater efficiency. Hydrogen concentration may be boosted throughout the anode channel so that hydrogen will preferentially be consumed as the principal component undergoing anodic oxidation in both the first and second portions of the anode, while the elevated concentration of hydrogen also opposes carbon deposition by hydrocarbon cracking reactions. To the extent that direct oxidation of hydrocarbons also takes place while hydrogen is oxidized preferentially over the first anode portion, LPG hydrocarbon components would be oxidized more rapidly than methane to minimize their contribution to downstream carbon deposition risks. While direct oxidation of hydrocarbons only takes place to a minor degree in the present invention, the use of anode materials suitable for direct oxidation of dry hydrogen allows the circulation of dry or nearly dry hydrocarbons with hydrogen being oxidized over the first anode portion, for greater voltage efficiency and power density. In a particular embodiment of the combined first and second variants, the highly hydrogen-enriched fuel mixture admitted to the anode inlet may desirably contain no more than 1.5 moles of steam per mole of hydrogen.

Examples of the disclosed systems thus exploit the carbon deposition resistance of so-called "direct oxidation" anode materials, while largely or entirely avoiding the less efficient direct oxidation of hydrocarbon fuels in favour of oxidation of recycled hydrogen. As more reactive higher hydrocarbons will be preferentially oxidized relative to methane, the present systems may to some degree exploit the direct oxidation feature to consume a portion of the higher hydrocarbons preferentially upstream of the anode portion(s) active for steam reforming, so that carbon deposition is safely avoided even at low steam/carbon ratios, such as when the ratio of steam to carbon is no more than 1.5 on a mole/mole basis.

Anode materials resistant to carbon deposition will typically have much lower activation polarization losses when hydrogen is a major fraction of the fuel stream, as compared to a fuel stream comprising hydrocarbons without free hydrogen. By separating water vapour and carbon dioxide from the anode exhaust stream using gas separation means, and recycling enriched hydrogen to the anode inlet, hydrogen is the main fuel consumed at the anode. Reforming of the hydrocarbon fuel to generate hydrogen takes place in the second anode portion using steam generated as the anode reaction product in the first anode portion, and may also take place upstream of the anode inlet in a pre-reformer and/or downstream of the anode outlet in an optional post-reformer. After cooling from the anode outlet, the anode exhaust gas may be contacted with a catalyst active for the water gas shift reaction, before the at least partial separation of water vapour and carbon dioxide after which recovered hydrogen is recycled to the anode inlet. Carbon dioxide separation may alternatively be conducted in conjunction with the water gas shift reaction.

In a third variant of the disclosed embodiments, which may be applied in conjunction with the first and/or second variants, the cathode inlet of the SOFC cathode channel is supplied with enriched oxygen instead of air. Such enriched oxygen may be supplied by any source known in the art, including adsorption based oxygen concentration devices and systems, such as are disclosed in the copending patent applications noted and incorporated by reference above. The oxygen utilization in the cathode channel may be in the range of about 65% to about 90%. The remaining oxygen in the cathode exhaust gas may be delivered from the cathode outlet at elevated temperature, and is still greatly enriched in oxygen relative to air. Some or all of the cathode exhaust gas may be mixed with preheated hydrocarbon fuel gas (or vapour if the hydrocarbon is a liquid fuel) and may be reacted with the fuel in a catalytic partial oxidation step. Such a catalytic partial oxidation step may consume all the oxygen and convert a portion of the hydrocarbon fuel to syngas. After this step, the fuel is admitted to the SOFC anode inlet. If the oxygen utilization in the fuel cell cathode channel is in the range of about 65% to 70%, substantially complete conversion of a hydrocarbon to syngas may be achieved in the catalytic partial oxidation step. If the oxygen utilization in the fuel cell cathode channel is much higher, e.g. in the range of about 80% to 90%, only partial conversion of a hydrocarbon fuel would be achieved in the catalytic partial oxidation step, which is thus a pre-reforming step. The pre-reforming step may usefully convert higher hydrocarbons to syngas and/or methane, as internal reforming of methane within the SOFC anode channel is less sensitive to carbon deposition.

In one version of the third variant, hydrogen recovered from the anode exhaust gas according to the first variant may be mixed with the fuel gas either before or after the catalytic partial oxidation step. In another variation, a fraction of the anode exhaust gas containing water vapour and carbon dioxide may be recycled and mixed with the fuel before the catalytic partial oxidation step. Alternatively, steam may be injected into the fuel before the catalytic partial oxidation step, which with steam addition may be described as an autothermal reforming step. It is preferred that a minimal amount of steam be added as may be required to suppress carbon deposition, so as to avoid an excessive drop of SOFC voltage efficiency.

In another version of the third variant, the fuel flow in the anode channel may be counter-current to the oxidant flow in the cathode channel, so that the cathode outlet is adjacent to the anode inlet. The catalytic partial oxidation or autothermal reforming reaction zone is at the anode inlet. The cathode exhaust gas may thereby mix with fuel gas or vapour entering the catalytic partial oxidation reaction zone.

Since the cathode exhaust is consumed adjacent the anode inlet, sealing of the SOFC is greatly simplified in the above version of the third variant. Simple sealing geometries of those prior art SOFC devices which combine the anode exhaust gas and cathode exhaust gas in an exhaust combustor may be applied in the third variant. The first variant of the disclosure (hydrogen separation and recycle from anode exhaust gas) requires that sealing means be provided so that at least a portion of the anode exhaust gas not be mixed with the cathode gas. The third variant allows the first variant to be implemented with the simplest possible SOFC stack sealing. Thus, the first, second and third variants may be advantageously implemented in combination.

Hydrogen may also be generated by reacting a hydrocarbon fuel with steam and/or oxygen, and water gas shifting to maximize concentrations of hydrogen and carbon dioxide in the resulting syngas mixture. In a particular embodiment of the third variant, desirably enriched oxygen for autothermal reforming (ATR) or partial oxidation (POX) syngas generation processes may be generated by vacuum pressure swing adsorption (VPSA), whose exhaust stream is nitrogen-enriched air withdrawn under vacuum. The syngas may be provided as the feed or first gas mixture to the VPSA, preferably after condensation water knock-out. The nitrogen-enriched exhaust of the oxygen VPSA unit may be used as the displacement purge, at its vacuum pressure. Thus, the first pressure may be established by the oxygen delivery pressure to the ATR or POX process with allowance for pressure drops through the reactors, while the second pressure may be established by a vacuum pump which withdraws the second gas mixture including both $CO_2$ rejected from hydrogen enrichment and nitrogen rejected from air separation. The enriched hydrogen stream may then be subjected to further purification steps to remove residual carbon monoxide and other impurities, prior to introduction to the fuel cell anode inlet.

An embodiment of the enhanced fuel cell systems includes a gas separation device or system for separating hydrogen enriched fuel gas from the reaction product of carbon dioxide, so that hydrogen and optionally other fuel components may be recycled to the anode, while the carbon dioxide is either discharged to atmosphere or discharged as a concentrated product of the process. In the case of a MCFC, at least a portion of the carbon dioxide may be concentrated and may be recycled to the MCFC cathode inlet. Such a gas separation device may use alternative separation principles such as membrane permeation or physical or chemical absorption for removal of carbon dioxide from the recycle hydrogen stream, or maybe based on adsorptive separation. Several such regenerable adsorptive gas separation devices and systems suitable for separating hydrogen and/or carbon dioxide in the embodiments of the present invention, are disclosed in detail in commonly-assigned, copending U.S. patent application Ser. No. 10/389,539 entitled "Gas Separation by Combined Pressure Swing and Displacement Purge", the contents of which in its entirety are herein incorporated by reference. The above reference also discloses in detail suitable processes for use in conjunction with such adsorptive gas separation devices in the fuel cell systems of the present invention. Several fuel cell system arrangements based on both SOFCs and MCFCs to which any combination of the previously mentioned first, second and third variants may be applied to form embodiments of the present fuel cell systems are disclosed in commonly-assigned, copending U.S. patent application No. 60/451,057 entitled "Hydrogen Recycle for High Temperature Fuel Cells" the contents of which in their entirety are herein incorporated by reference.

In a fourth variant of the disclosure, embodiments of the inventive SOFC and MCFC systems incorporating improved gas separation processes and apparatus, and/or energy recovery means directed to improving the energy efficiency of the systems are disclosed. Such improved gas separation processes and apparatus may include improved adsorptive separation processes such as multi-stage pressure swing adsorption, and/or improved adsorptive separation apparatus such as staged rotary adsorber modules. Such energy recovery means may recover thermal, mechanical, pressure or other form of energy from the system, in order to improve efficiency and may include such exemplary energy recover means as gas turbines, expanders, gas ejectors, and heat exchangers. Additionally, some embodiments according to the fourth variant may include alternative hydrogen recycle means other than external enrichment by gas separation, either alone, or in combination with other hydrogen recycle means disclosed above. Such alternative means may include for example the use of an ejector pump to provide an internal recycle of at least a portion of anode exhaust gases to the anode inlet.

The foregoing features and advantages will become more apparent from the following detailed description of several examples that proceeds with reference to the accompanying figures.

BRIEF DESCRIPTION OF THE DRAWINGS

Certain embodiments are described below with reference to the following figures.

DETAILED DESCRIPTION OF SEVERAL EXAMPLES

A hydrogen-enrichment rotary adsorption module 10 with displacement purge regeneration is incorporated as an exemplary gas separation means for enriching hydrogen from anode exhaust and/or concentrating or removing carbon dioxide from the anode exhaust in conjunction with a high temperature fuel cell system 12 illustrated in FIGS. 1-4. As used herein, "rotary adsorption module 10 includes, but is not limited to, either a device wherein an array of adsorbers rotates relative to a fixed valve face or stator or a device wherein the rotary valve face rotates relative to a stationary array of adsorbers. Illustrated embodiments show the adsorbers mounted in a rotor, with the rotor in a housing which is a stator with fixed valve faces. Alternative rotary gas adsorption modules suitable for application to the depicted embodiments are described in the previously mentioned copending patent application Ser. No. 10/389,539.

Figure 1:
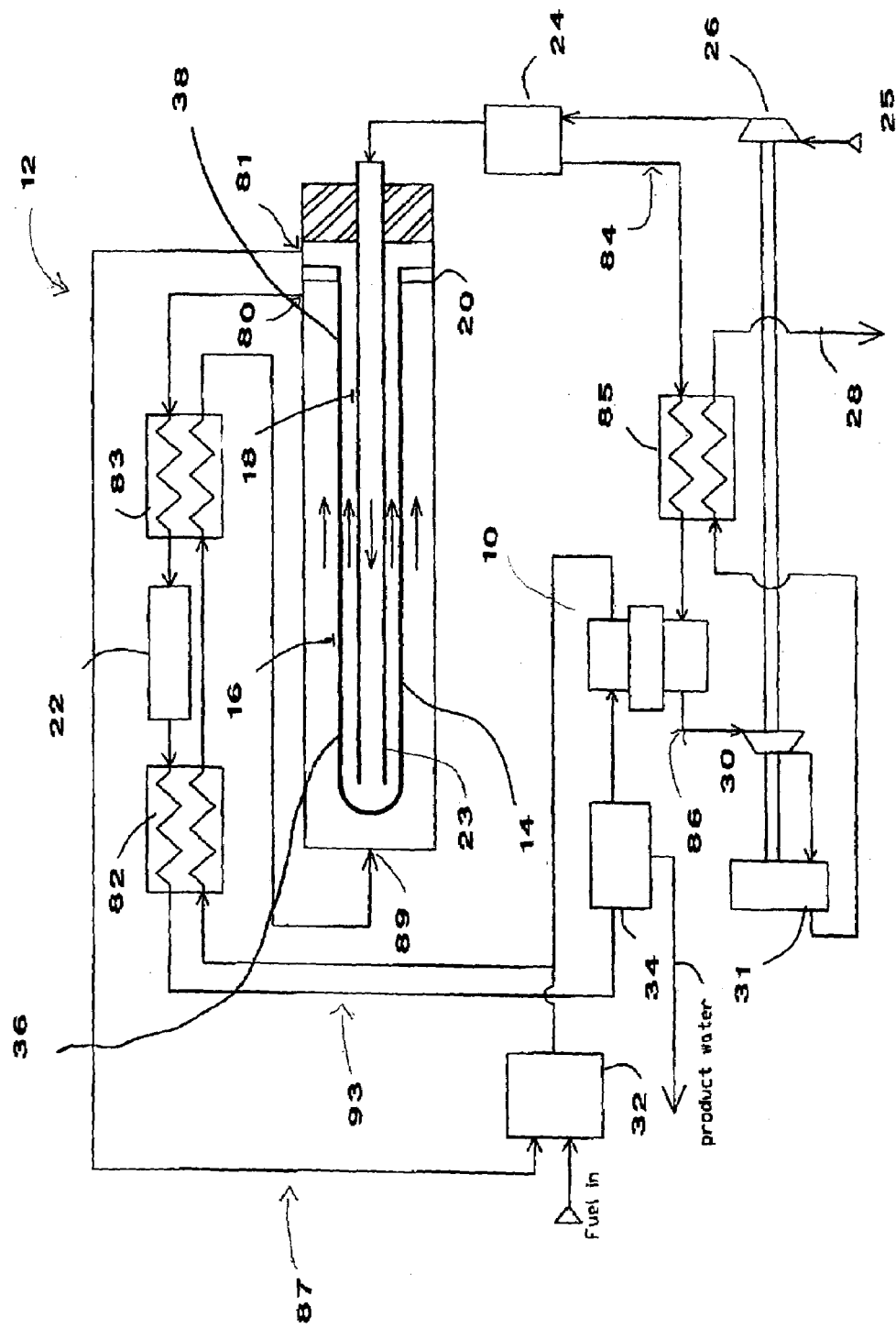
FIGS. 1 through 5 show simplified schematics of alternative SOFC power plant embodiments sing the rotary adsorption module for enrichment and recycling of hydrogen from the anode exhaust gas.
Figure 2:
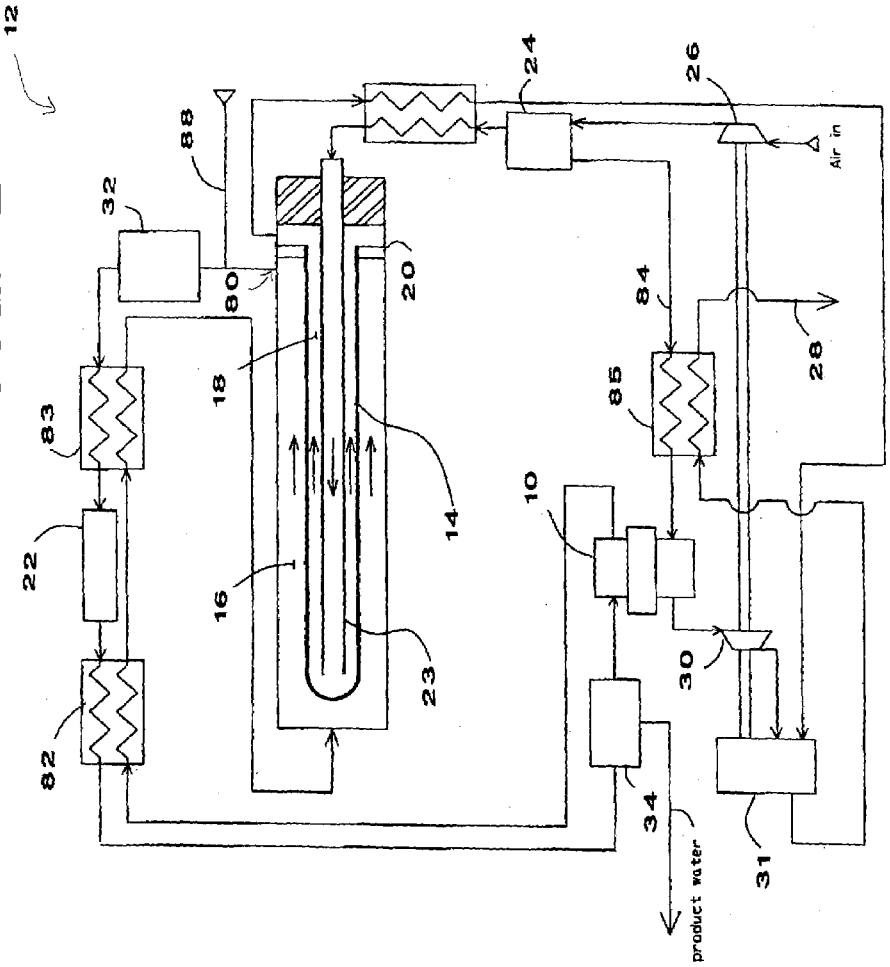

FIGS. 1 and 2 show a solid oxide fuel cell power plant, with one SOFC tubular element 14 of the air electrode support (AES) type shown. The flows in an anode channel 16 and a cathode channel 18 are cocurrently directed. Unlike a conventional "3 port" SOFC arrangements known in the prior art in which the anode and cathode exhaust are combined through an afterburner chamber, a seal 20 is provided to separate an anode outlet 80 and a cathode outlet 81 so that the depicted embodiment functions as a "4 port" SOFC. The anode exhaust 93 may be recuperatively cooled via a first recuperator 82 and a second recuperator 83 through an optional water gas shift reactor 22, and introduced at a pressure P1 and a temperature T1 to a rotary adsorption module 10 in which carbon dioxide is adsorbed.

Enriched oxygen is shown delivered to the cathode channel 18 within the SOFC tubular element 14 by an exemplary injector tube 23. The oxygen may be generated by a rotary PSA or VPSA unit 24 using a suitable nitrogen-selective adsorbent. Air 25 may be delivered to the oxygen PSA or VPSA unit 24 by a compressor 26, while nitrogen-enriched exhaust 84 may be withdrawn under vacuum at a pressure P2. After optionally heating to a temperature T2 via a third recuperator 85, the nitrogen-enriched air may be used to purge the rotary adsorption module 10. Regeneration of the adsorbers in the rotary adsorption module 10 may be desirably assisted by pressure swing in the case where P1>P2, and by thermal swing if T2>T1.

It will be understood that the rotary adsorption module 10 could be operated in a pure PSA mode, with purge being provided only by reflux of substantially purified hydrogen, and with no admission of nitrogen-enriched air or other external sweep gas.

The air compressor 26 and a vacuum pump 30 shown (generating the vacuum pressure P2) may be driven by an engine means 31 which may be fueled at least in part by combustion of the tail gas 86 delivered from the rotary adsorption module 10 by the vacuum pump 30. This tail gas will desirably be a low BTU fuel. The engine means 31 may be a gas turbine with a catalytic combustor, or may be an internal combustion engine if the enriched oxygen from the cathode exhaust is used as oxidant as shown in FIG. 2. NOx emissions from this engine means 31 may be minimal, if it is burning the rotary adsorption module 10 tail gas (major impurity $CO_2$) with enriched oxygen (major impurity argon).

An alternative use for the oxygen enriched cathode exhaust gas 87 is to support catalytic partial oxidation in an autothermal pre-reformer 32 processing the fuel to crack higher hydrocarbons and to achieve partial conversion to syngas, as shown in FIG. 1. It may be noted that steam would need to be added to the fuel entering the pre-reformer 32 of FIG. 1 to prevent coking therein.

In FIG. 2, an adiabatic pre-reformer 32 is coupled to the fuel cell anode outlet 80, so that fuel 88 enters the pre-reformer 32 together with recycled anode exhaust gas containing all of the product water vapour of the SOFC reaction. Accordingly, no external steam may need to be added to this pre-reformer 32. After partial conversion of the fuel and any methane in the anode exhaust to syngas, together with hydrocracking of higher hydrocarbons, this stream may be cooled recuperatively to a water gas shift reactor 22 and may then be cooled recuperatively to a condenser 34 for water knock-out, followed by hydrogen and methane enrichment in the rotary adsorption module 10. Improved performance may be achieved when the anode gas in an internally reforming SOFC contains methane as well as excess hydrogen, with the methane serving as a reactive sink to depress the ratio of steam to hydrogen along the anode channel.

In FIGS. 1 and 2, the anode channel 16 has a first portion 36 adjacent to an anode inlet and a second portion 38 adjacent its outlet 80. The first portion 36 may use an anode electrocatalyst which is resistant to carbon deposition, and therefore presumably substantially inactive to the steam reforming reaction. For a lower temperature SOFC working at e.g. 650° C., an exemplary suitable such anode material may be copper ceria cermet. The second portion 38 (being protected by steam generated upstream by the SOFC reaction) may use an anode electrocatalyst selected for steam reforming activity, e.g. based on nickel which readily dissolves carbon that in the absence of steam may deactivate the anode by carbon whisker growth. Thus, the first portion 36 reacts hydrogen to generate steam, while further steam build-up is avoided or at least reduced in the second portion 38 as steam is consumed to react methane and replace hydrogen. The anode electrocatalysts may be included as a component of the anode channel wall and/or it may be coated onto a surface of the wall. Another option is to provide the electrocatalyst within the anode channel passage, such as via a porous material disposed upon a support.

Figure 3:
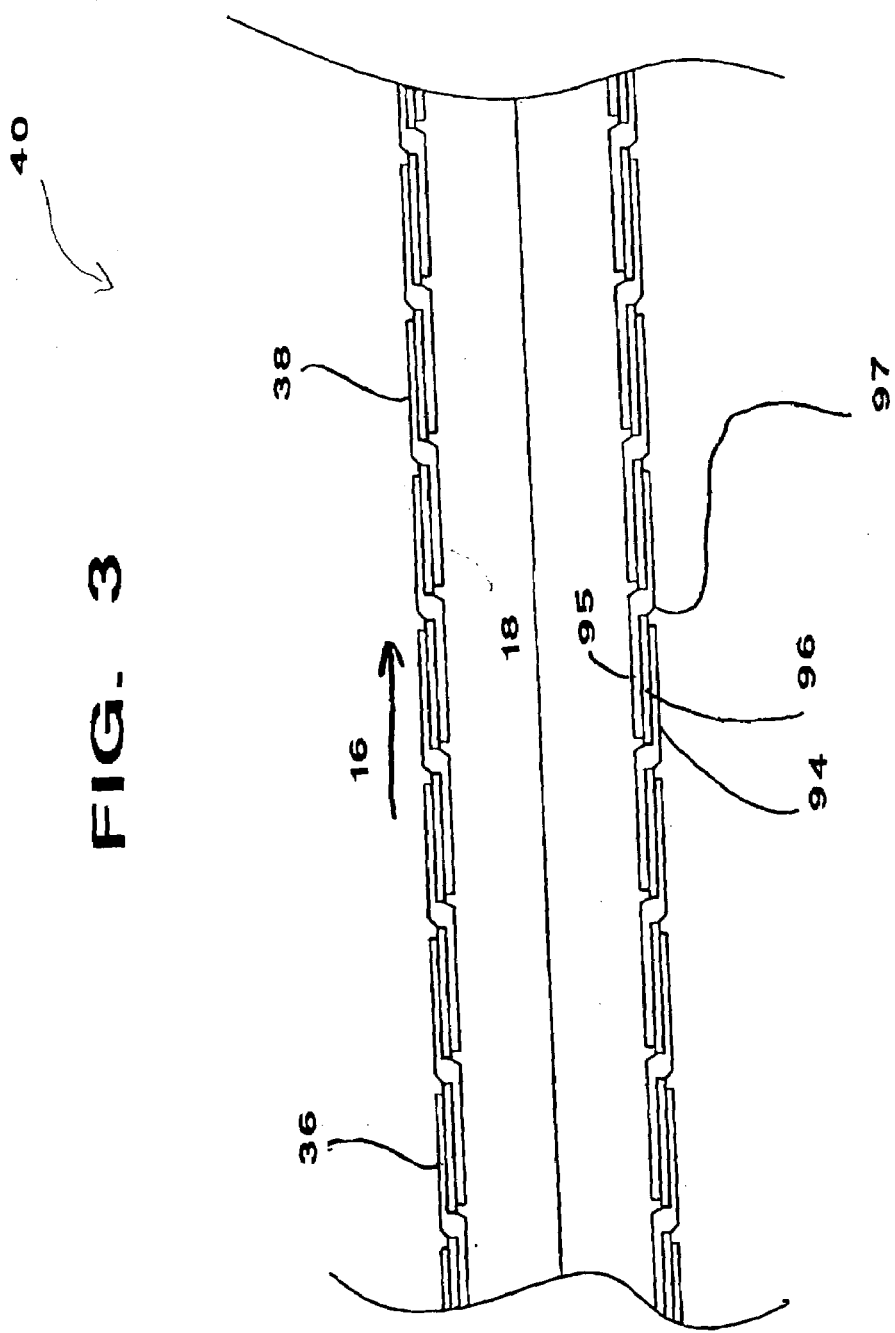

FIG. 3 shows a detail view of segmented SOFC tube 40, whose first anode portion 36 and second anode portion 38 are separate cell segments using different anode electrocatalysts as above described. The metallic cermet composition of the anode segments 94 may be graded along the anode channel 16 from copper through cupronickel alloy to nickel. The anode segments 94 are appropriately juxtaposed with cathode segments 95. An electrolyte 96 is disposed between the anode 94 and the cathode 95. An interconnect 97 connects each segment together.

Figure 4:
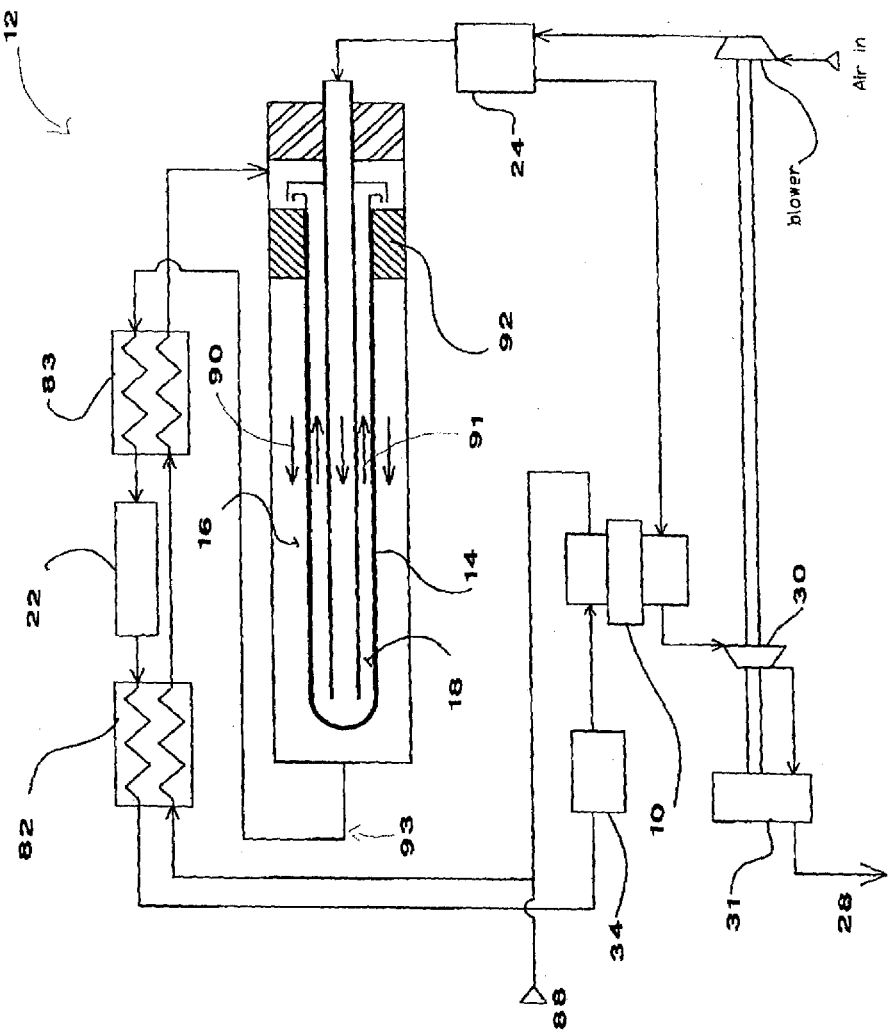
Figure 5:
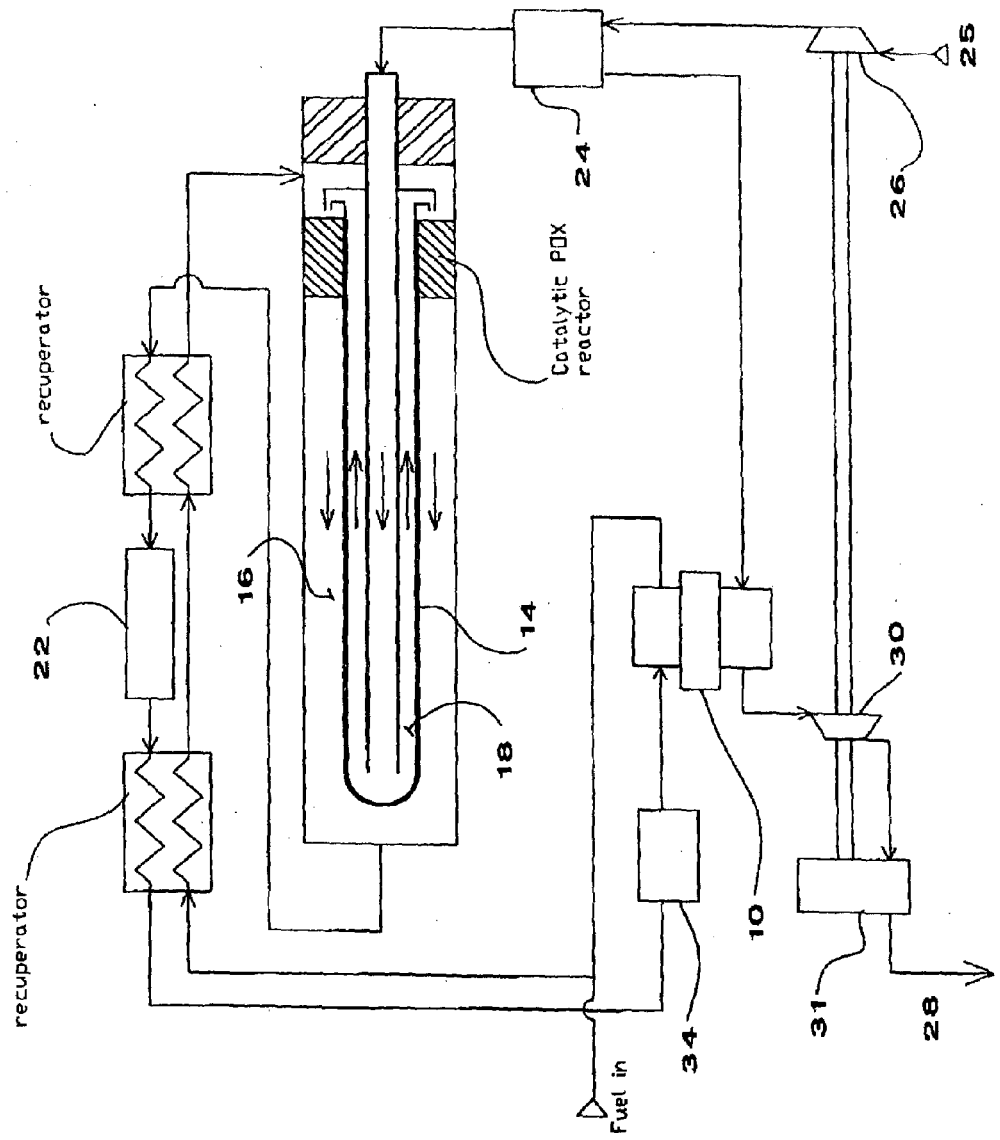

FIGS. 4 and 5 show another embodiment in which the anode 90 and cathode 91 flows are countercurrent in a "3 port" SOFC configuration, and with FIG. 5 showing two SOFC tubular elements in parallel. The still oxygen-enriched cathode exhaust reacts with incoming preheated fuel in a catalytic partial oxidation or autothermal pre-reformer 32 interposed between the cathode exhaust and anode inlet of the fuel cell elements, within the fuel cell housing. A partial oxidation catalyst 92 may be provided as a noble metal on a wire gauze support. The anode exhaust 93 may be recuperatively cooled to water gas shift, and then further cooled to the condenser 34 and the rotary adsorption module 10. The enriched hydrogen may be mixed with incoming fuel, and may then be recuperatively heated with the fuel for admission to the autothermal pre-reformer 32. Steam may be added to the fuel as needed.

It will be appreciated that this variant may also be applied to any known "3 port" SOFC geometry, including circular planar stacks as used by Sulzer-Hexis. The partial oxidation catalyst wire gauze would then be wrapped around the stack in the annular space between the SOFC plates and the housing.

FIGS. 6-8

Figure 6:
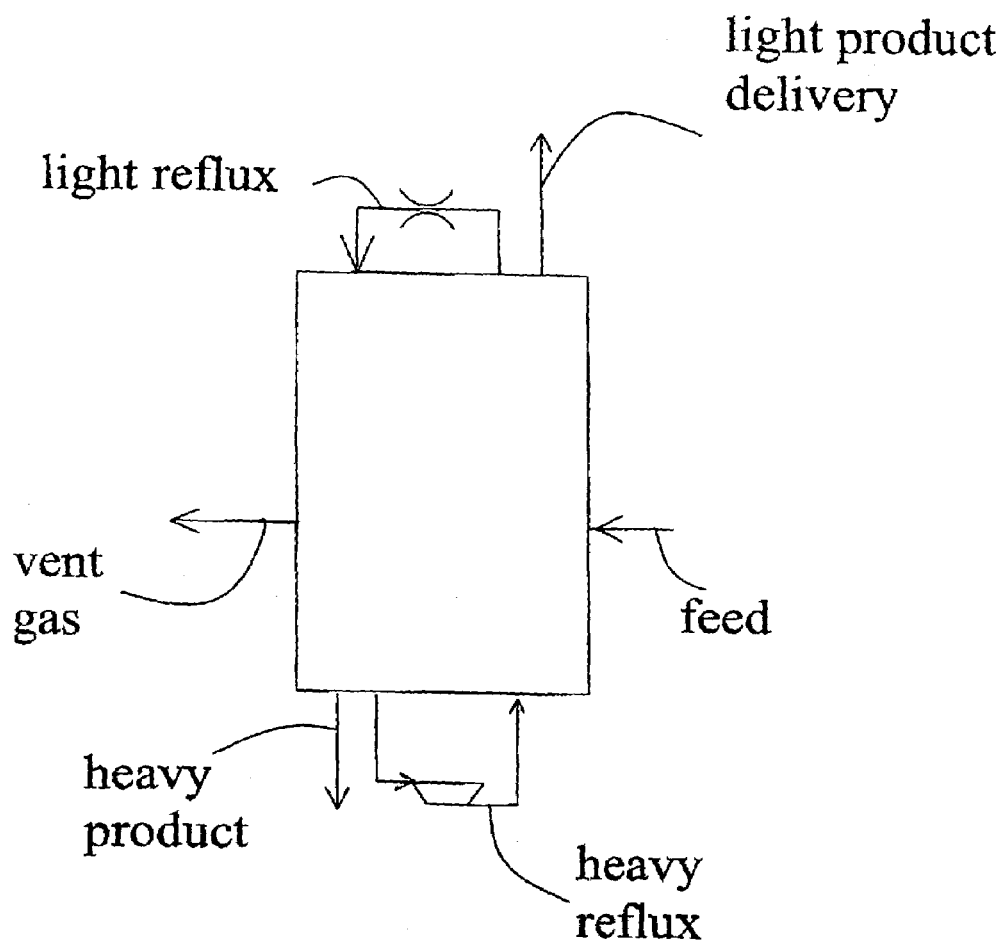
FIGS. 6 through 8 show simplified schematics of two stage rotary pressure swing adsorption (PSA) systems.
Figure 7:
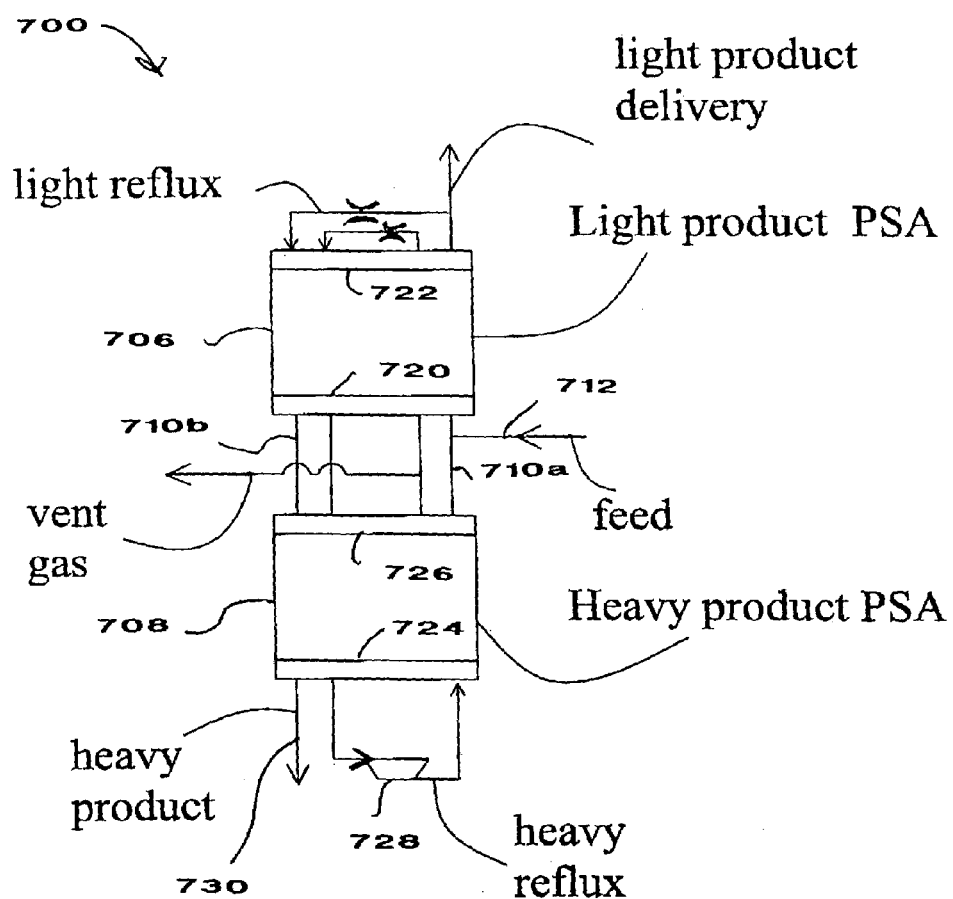
Figure 8:
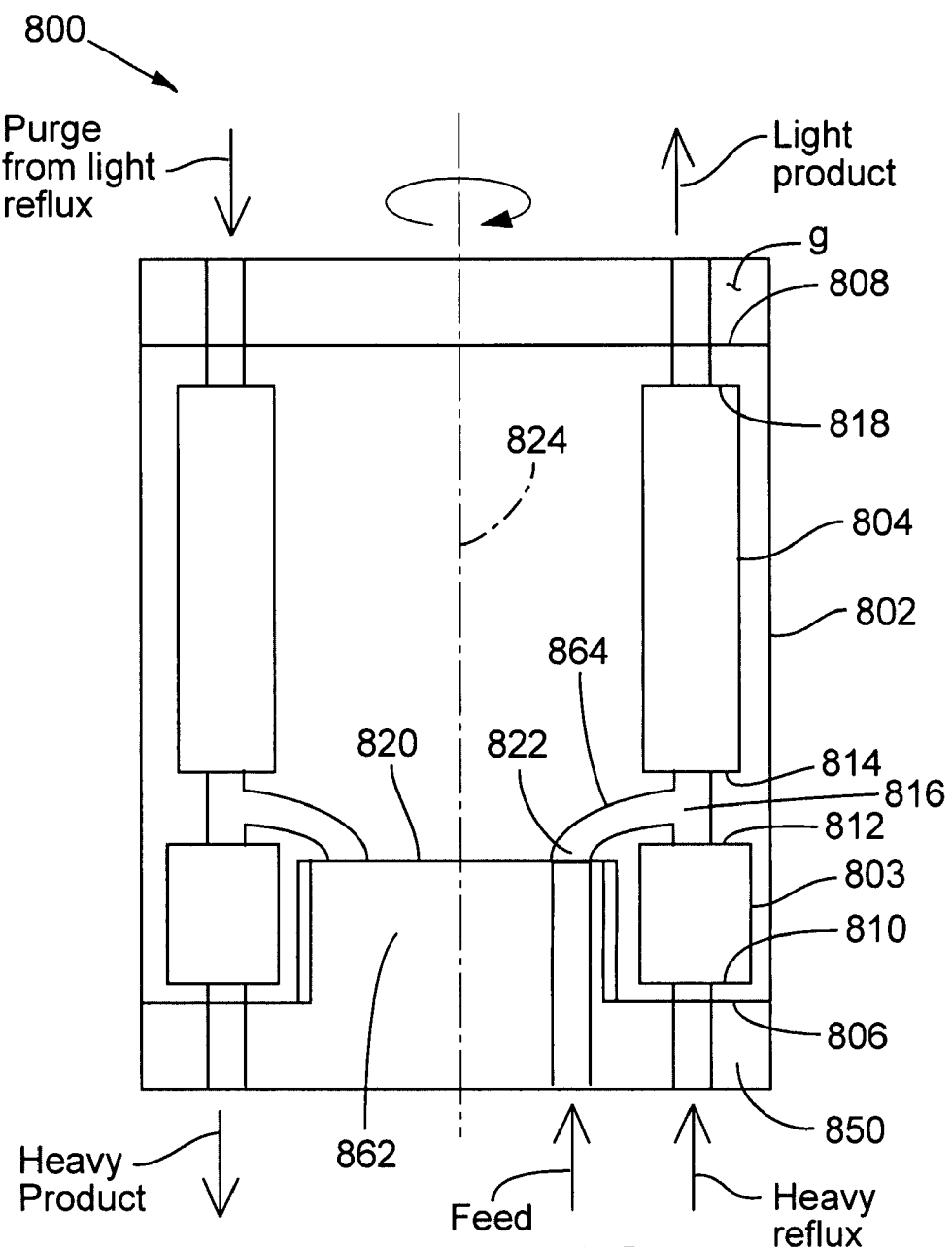

FIGS. 6 through 8 show simplified schematics of two stage rotary PSA systems. FIG. 6 is a simplified diagram providing reference of fluid connections (as needed for alternative two stage PSA embodiments such as illustrated in FIGS. 7 and 8) in the SOFC systems of FIGS. 18-24.

FIG. 7 shows a two stage PSA embodiment 700 with separate rotary adsorber modules for the hydrogen enrichment and carbon dioxide enrichment stages. The exemplary two stage hydrogen PSA unit 700 includes a hydrogen enrichment stage provided as rotary adsorber module 706, cooperating with a carbon dioxide enrichment stage provided as rotary adsorber module 708. The hydrogen enrichment rotary adsorption module 706 has a first valve face 720 and a second valve face 722, while the carbon dioxide enrichment rotary adsorption module 708 has a first valve face 724 and a second valve face 726. A plurality of interconnection conduits 710 are provided between valve faces 720 and 726, so as to provide fluid communication between adsorbers which are at substantially the same instantaneous working pressure and phase of the PSA cycle in respectively modules 706 and 708. The feed is delivered via conduit 712 to an interconnection conduit 710a corresponding to the higher pressure of the PSA cycle, while heavy reflux from heavy reflux compressor 728 is admitted to valve face 720 also at the higher pressure of the PSA cycle, with enriched hydrogen also being delivered at the higher pressure from valve face 726. During a lower pressure interval of the PSA cycle, module 706 is purged by a light reflux flow, while impurities including CO2 are transferred from valve face 720 to valve face 726 by an interconnection conduit 710b corresponding to the lower pressure, and concentrated CO2 is delivered from valve face 720 to conduit 730 or heavy reflux compressor 728. The highest CO2 concentration may be achieved at valve face 724 during a countercurrent blowdown step of the PSA cycle, when the CO2 enriched stream would preferably to delivered to conduit 730. For given hydrogen purity and recovery, heavy reflux flow and associated compression power consumption are reduced with the two stage hydrogen PSA, especially when the feed hydrogen concentration is relatively high.

FIG. 8 shows an exemplary two stage PSA embodiment 800 with a single rotor 802 including "N" first adsorbers 803 for concentrating $CO_2$ and "N" second adsorbers 804 for concentrating hydrogen. The rotor 802 has "N" flow paths between valve ports of the rotor 802 respectively communicating to the first valve face 806 and second valve face 808 of the rotor 802. Each of the "N" flow paths passes through a single first adsorber and a single second adsorber. Each first adsorber 803 communicates at a first end 810 thereof to the first valve face 806, and at a second end 812 thereof to the first end 814 of a second adsorber 804 at a junction 816 in the same flow path, while the second end 818 of the second adsorber 804 communicates to the second valve face 808. A third valve face 820 (coaxial with the first valve face 806 and second valve face 808) is also provided. The third valve face 820 has an annular ring of "N" ports 822 on the rotor side of valve face 820, each communicating to the junction 816 of one of the "N" flow paths between the second end 812 of the first adsorber 803 and the first end 814 of the second adsorber 804 in that flow path.

While each of the three valve faces may in general be any surface of revolution coaxial to rotary axis 824, they are illustrated in FIG. 8 as flat disc valve faces cooperating with axially oriented adsorber flow paths. The third valve face 820 may be positioned to be coplanar with either the first valve face 806 or the second valve face 808, with the respective valve ports of coplanar valve faces located in radially separated annular rings so as to avoid cross leakage between the valve faces. More desirably, as shown in FIG. 8, the third valve face 820 is located at an intermediate position between the first valve face 806 or the second valve face 808 so as to reduce the length and dead volume of conduits 864 between the ports in the third valve face 812 and junction 816.

It has been determined experimentally that the volume and length of the first adsorbers 803 may desirably be about ⅓ (or in a range of about ⅕ to about ½) of the corresponding volume and length of the second adsorbers 804, for efficient bulk removal of $CO_2$ from hydrogen. Consequently, it is convenient for the third valve face 820 to be close to (and if desired coplanar with) the first valve face 806. Accordingly, the stator 862 for the third valve face 820 is shown in FIG. 8 as extending from the stator 8 of the first valve face 806.

FIGS. 9-12

FIGS. 9 through 12 show rotary valve opening sequences and the pressure pattern over an exemplary complete PSA cycle, for a single adsorber in a rotary PSA unit. All of the other adsorbers in the rotary PSA unit will sequentially undergo the same sequence with essentially the identical pressure pattern.

In each of FIGS. 9 through 12, the horizontal scale is time over a complete cycle period. The lower part 901 of each FIGS. 9 through 12 shows the nominal PSA working pressure as a function of time over the cycle period. The PSA cycle is shown arbitrarily as starting and ending at approximately the midpoint of the pressurization steps for the adsorber under consideration.

Figure 9:
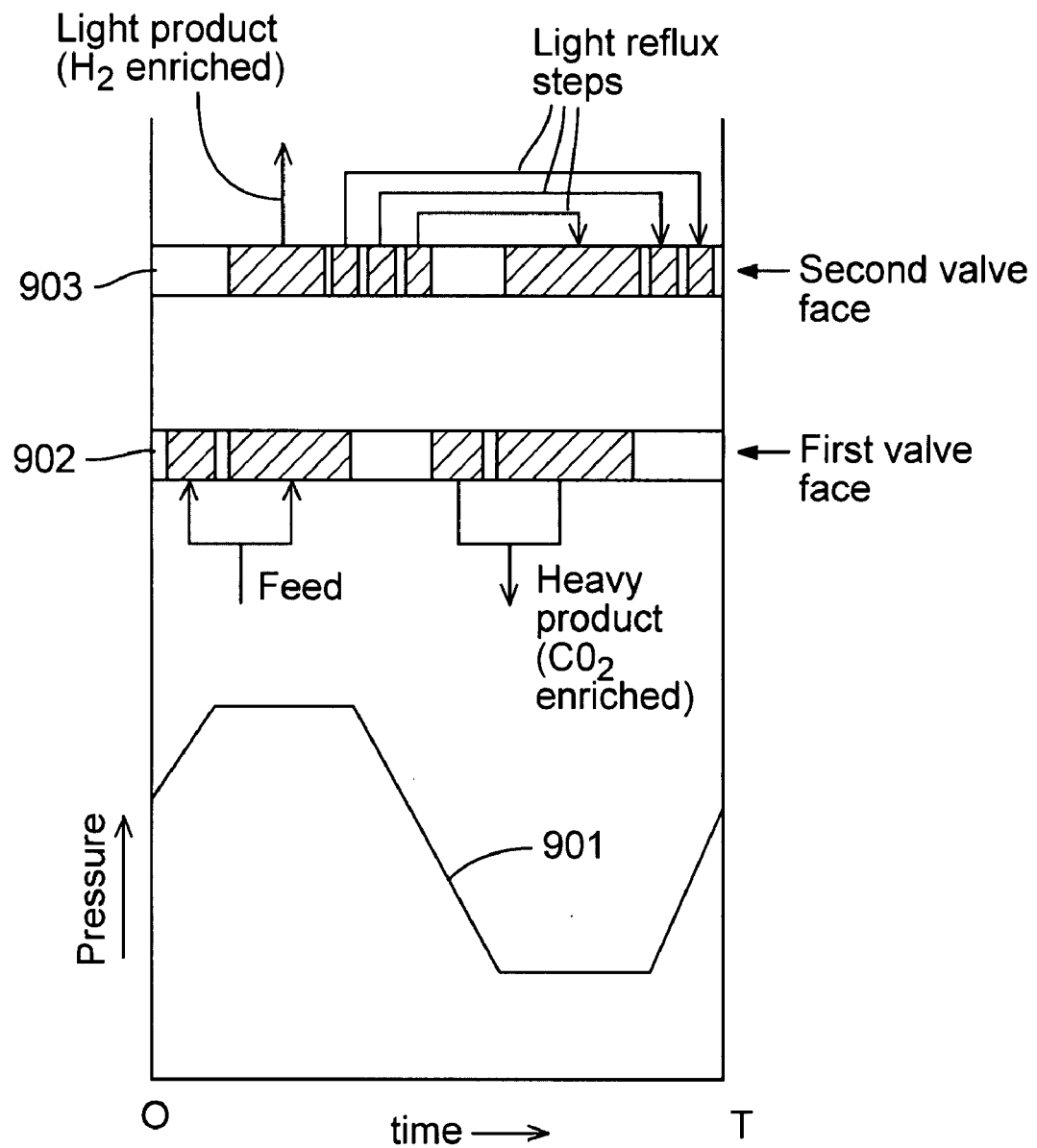
FIGS. 9 through 12 show rotary valve opening sequences and the pressure pattern over a complete PSA cycle.
Figure 10:
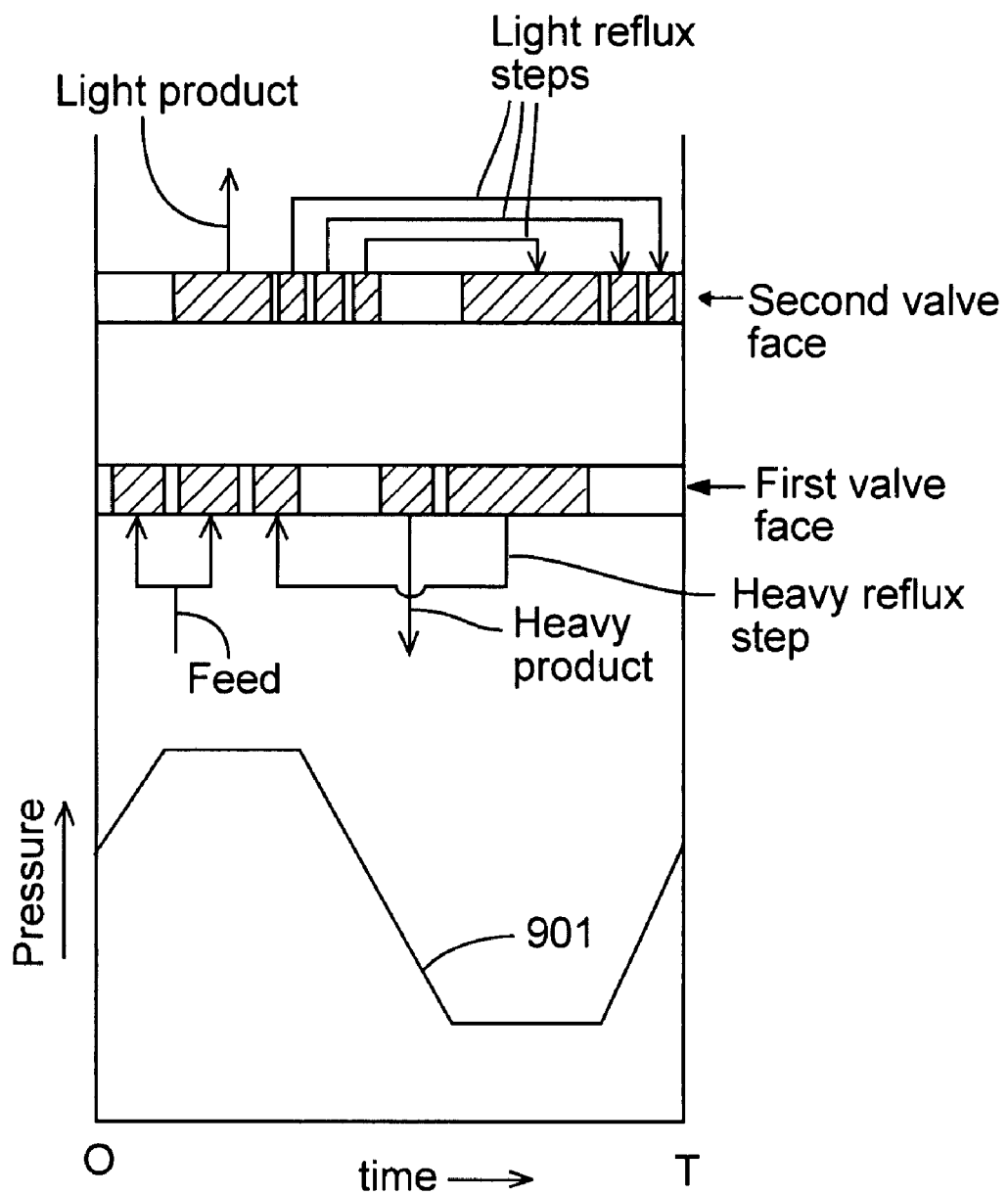
Figure 11:
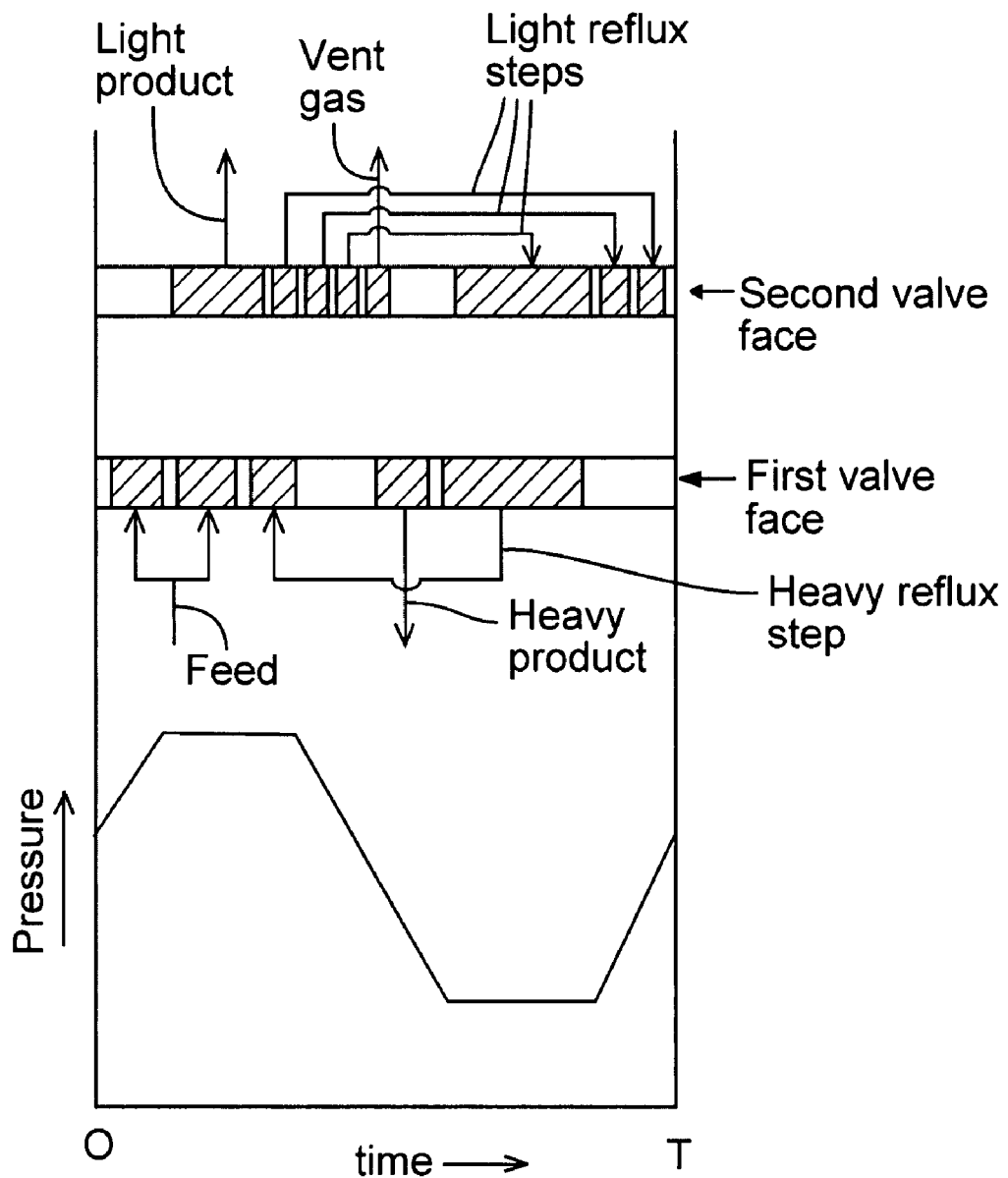

The upper part of each FIGS. 9 through 12 shows the valve opening intervals and identifies the corresponding flows, shown as a horizontal bar 902, 903 for each rotary valve face, with diagonal hatching denoting open intervals for each valve face. For PSA cycles shown in FIGS. 9 through 12, each diagram shows a lower horizontal bar 902 corresponding to the first valve face or "heavies valve" here dealing with gas flows relatively concentrated in $CO_2$, and an upper horizontal bar 903 corresponding to the second valve face or "lights valve" here dealing with gas flows relatively concentrated in H2. FIGS. 9 through 11 correspond to single stage PSA units such as shown in FIG. 1, while FIG. 12 corresponds to two stage PSA units as shown in FIGS. 6-8. For the two stage PSA cycle of FIG. 12, a third horizontal bar 904 intermediate between the lower and upper horizontal bars is provided to indicate the opening sequence for valve ports admitting feed gas or releasing an intermediate vent gas at a point between the resective hydrogen enrichment and carbon dioxide enrichment stages of the two stage PSA units.

FIG. 9 illustrates a basic single stage PSA cycle with light reflux but without heavy reflux. Heavy product is delivered from both countercurrent blowdown and purge exhaust steps.

FIG. 10 illustrates an exemplary single stage PSA cycle with light reflux and heavy reflux. Heavy product is delivered from the countercurrent blowdown step while the low pressure purge exhaust is recompressed as heavy reflux. If desired for simplicity, the countercurrent blowdown and low pressure purge exhaust could be combined as a single heavy product stream, which a fraction of that stream recycled as heavy reflux.

FIG. 11 illustrates an exemplary single stage PSA cycle with light reflux and heavy reflux, and with a vent gas released at an intermediate pressure from a final cocurrent blowdown step. This vent gas provides a useful way to purge inerts such as nitrogen, and the vent gas may have high BTU value even when the $CO_2$ concentration of the heavy product is very high, as can be achieved with a relatively large heavy reflux flow.

Figure 12:
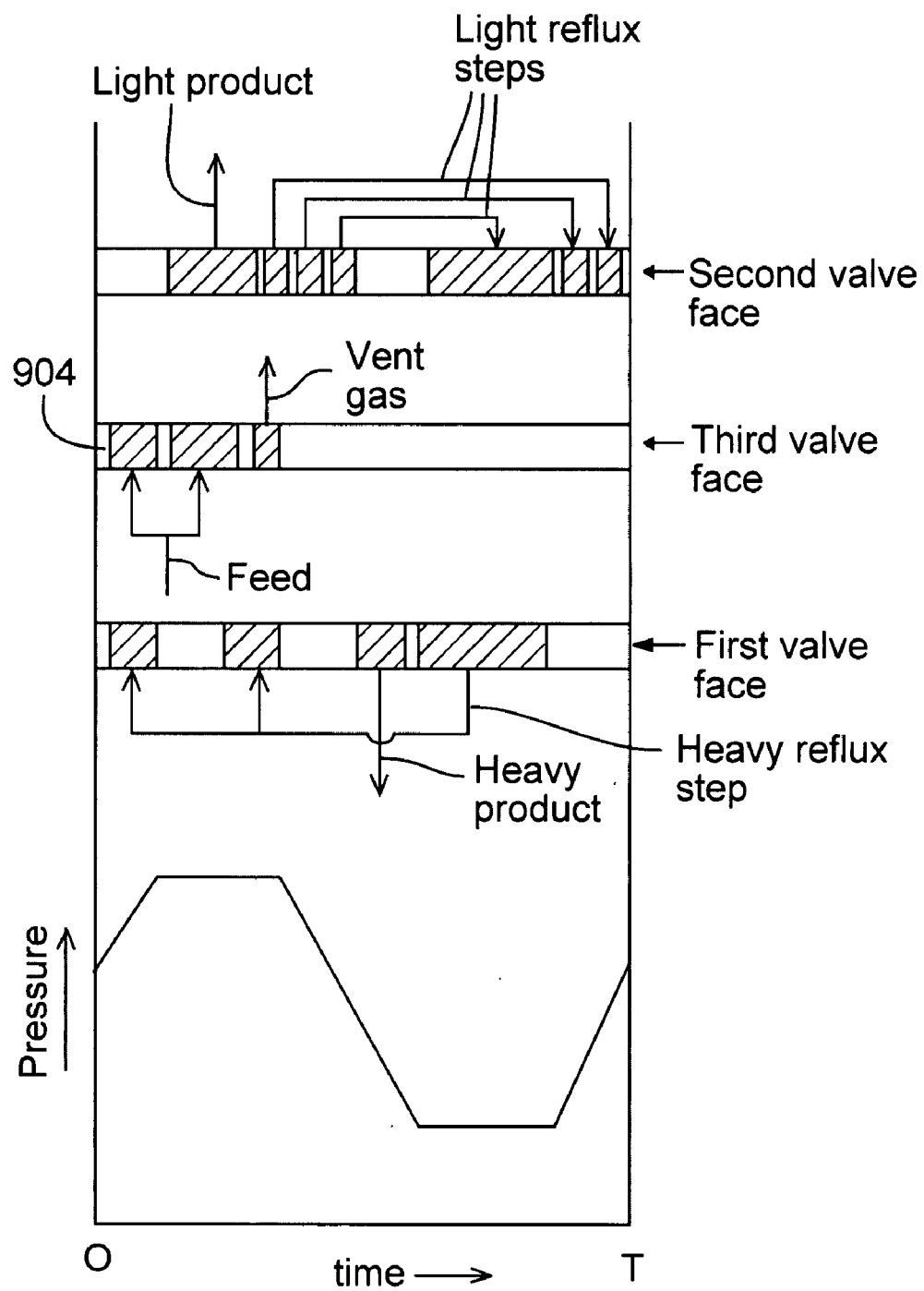

FIG. 12 illustrates an exemplary two stage PSA cycle, with feed admitted to a third valve face as in FIG. 8 and with vent gas released from the third valve face toward the end of the heavy reflux feed step performed at the higher pressure of the PSA cycle.

FIGS. 13-17

FIGS. 13 through 17 show simplified schematics of alternative SOFC power plant embodiments using a fuel such as natural gas, with the SOFC having a pre-reformer 32 and working at substantially atmospheric pressure, using an indirect externally heated gas turbine for heat recovery, and using a single stage vacuum PSA 24 (VPSA) as the hydrogen gas separation means.

All of these embodiments (as well as those in FIGS. 18-24) use the PSA 24 to enrich hydrogen while stripping $CO_2$ from the anode exhaust gas, with the hydrogen enriched light product to be recirculated with makeup fuel back to the anode inlet 89. Recycle of hydrogen and other fuel components will ensure that fuel starvation will not take place toward the end of the anode channel 16 approaching the anode outlet 80, so very high fuel utilization can be achieved in the SOFC stack. The ultimately achievable fuel utilization will be determined by the recovery of hydrogen and other light product fuel components that can be achieved in the PSA unit 24, and accordingly preferred embodiments incorporate heavy reflux to achieve high recovery of light fuel components in the recycle light product stream of the PSA. Hydrogen recycle will boost the concentration of hydrogen throughout the anode channel 16, and will facilitate operation with minimum supplemental steam at the anode inlet, so that a high voltage efficiency can be achieved.

The fuel cell is operated on a preferred fuel mixture of methane and recycled hydrogen, with as little steam as possible, and desirably not more than 1.5 moles of steam per mole of fuel. In inventive embodiments to facilitate SOFC operation with minimal or no steam addition at the anode inlet, the SOFC may be provided with a first electrocatalyst zone near the anode inlet and a second electrocatalyst zone near the anode outlet, either as different catalytic flavours in a single SOFC, or in separate SOFC stages in series as described below.

The first anode zone may desirably use a catalyst composition that inhibits carbon deposition, and may also be non-reactive to steam methane reforming. Such catalysts (e.g. copper-ceria cermets) have been considered in the art for "direct oxidation" of hydrocarbons fed dry to the SOFC anode inlet. The illustrated embodiment provides hydrogen recycle, so that the more reactive hydrogen will be preferentially oxidized in the first zone. Higher hydrocarbons might be oxidized (or hydrogenated) to some extent in the first anode zone, but would not be catalyzed into carbon deposition failure mode. Steam builds up as the reaction proceeds, so downstream in the second anode zone a more conventional "internal reforming" catalyst (e.g. nickel cermet) may be used to steam reform the methane into more hydrogen.

Anode exhaust gas may subjected to cooling by recuperative heat exchange with the incoming fuel and hydrogen-enriched recycle stream, to water gas shift in order to increase hydrogen and $CO_2$ concentrations prior to the PSA separation, and to water removal by condensation before being admitted as feed to the PSA unit 24. A blower 40 may be provided to boost the feed pressure to the PSA unit, and to drive circulation through the anode recycle loop.

The enriched hydrogen product of the VPSA 24 is mixed with fresh fuel makeup, which is then delivered with supplemental steam generated with heat recovery from the water gas shift reactor 22 (with a Heat Recovery Steam Generator (HRSG) 24 integrated with the water gas shift reactor 22 for cooling thereof). Supplemental steam may also be generated by heat recovery from the auxiliary gas turbine exhaust.

The mixture of fuel, recycled hydrogen and steam is delivered from the water gas shift reactor 22 to a pre-reformer 32 before entering the anode channel inlet 89. The main purpose of pre-reforming is to reduce the concentration of higher hydrocarbon components whose decomposition could result in carbon deposition within the anode channel 16.

Preferably, the pre-reformer 32 is operated at a relatively low temperature (e.g. about 500° C.), while the SOFC may operate at any suitable temperature in the typical range of about 500° C. to about 1000° C. By operating at relatively low temperature and with a substantial excess of recycled hydrogen, the endothermic steam reforming reactions (converting hydrocarbons to syngas) can be thermally balanced with the exothermic methanation and water gas shift reactions together with exothermic hydrogenation and hydrogenolysis of higher hydrocarbons, so that the pre-reforming step is approximately isothermal.

In the illustrated vacuum PSA embodiments (e.g. FIGS. 13-21), a first portion of the heavy product stream (preferably the countercurrent blowdown) is delivered as the $CO_2$ enriched product, and a second portion (preferably the exhaust from low pressure purge) is recycled as heavy reflux back to the PSA 24, as shown in FIGS. 10-12. A vacuum pump 30 is provided to exhaust the heavy product from the first valve face, and to deliver the heavy product or tail gas 99 and heavy reflux 98 streams. Preferably, separate vacuum pumps would be used for the heavy product and heavy reflux, to take advantage of the typically higher $CO_2$ concentration of the countercurrent blowdown as compared to the exhaust from low pressure purge.

Figure 13:
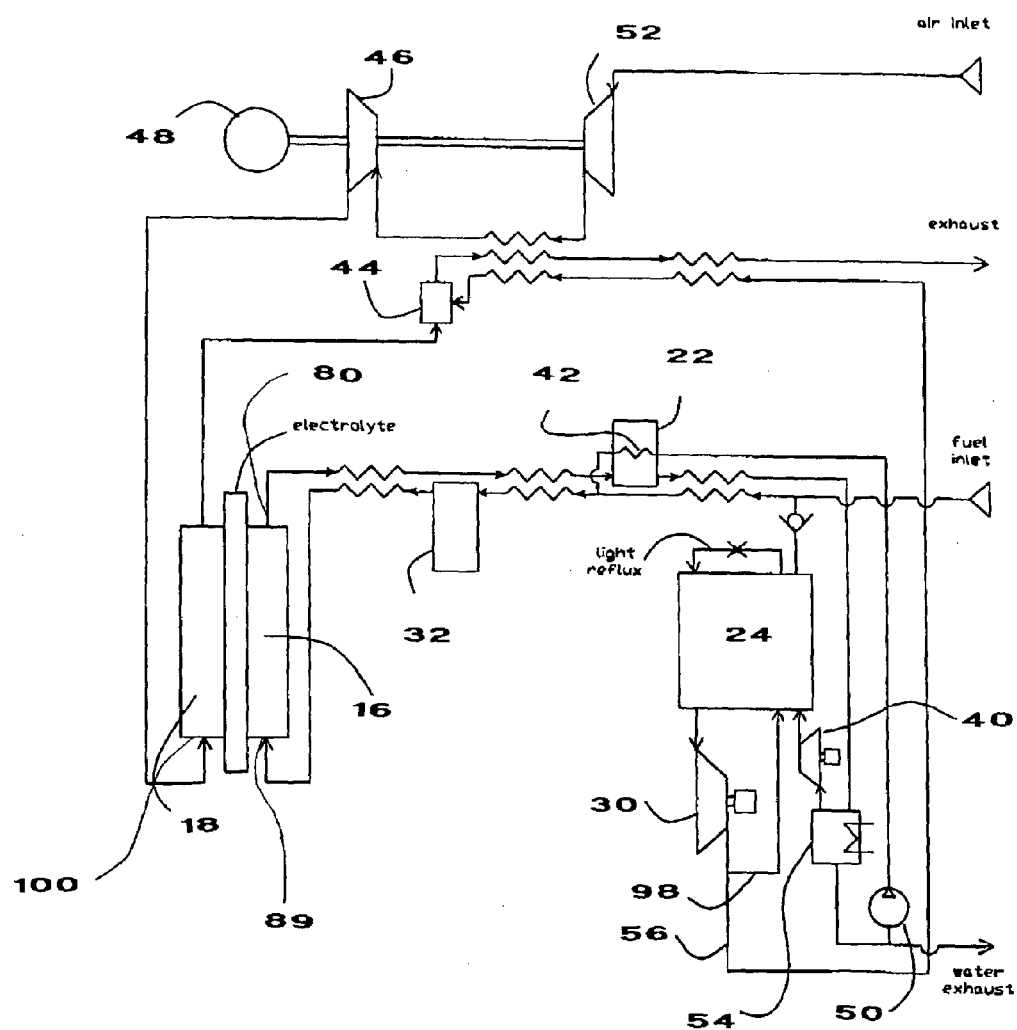
FIGS. 13 through 27 show simplified schematics of alternative SOFC power plant embodiments.
Figure 15:
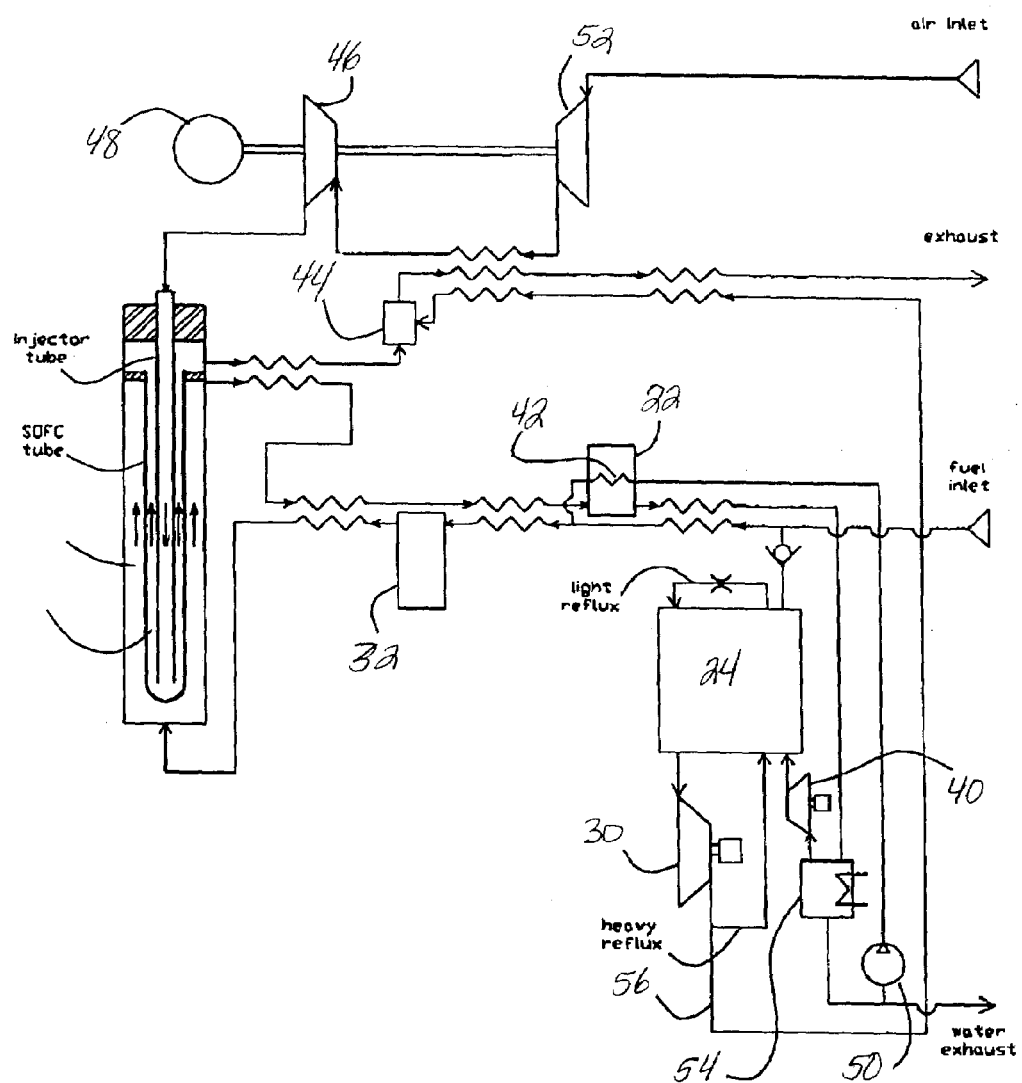

The calorific value of residual fuel components in the tail gas (heavy product) stream may be recovered by combustion in association with an indirect gas turbine recovering heat from the SOFC. The gas turbine exhaust of hot air may be provided as the preheated air feed to the cathode inlet 100. In FIGS. 13 and 15, the tail gas is preheated recuperatively, and then combined with the hot cathode exhaust air in a burner 44 operating at approximately ambient pressure. The burner 44 may need to be a catalytic burner in view of the low BTU value of the tail gas. The burner 44 adds heat to the cathode exhaust air which recuperatively heats an externally fired gas turbine compressing a feed air compressor and a high temperature expander or turbine. The gas turbine 46 may drive a generator 48 as shown, or may be mechanically coupled to directly drive any of the vacuum pump 30, blower 40 and water pump 50 loads of the SOFC plant. A hydrogen compressor 52 may also be provided to compress a fraction of the purified hydrogen from the PSA 24 for compressed storage or delivery to external hydrogen consumption.

If the water pump delivering water from the condenser 54 to the HRSG 42 (recovering heat from the water gas shift reactor 22 and/or the gas turbine exhaust gas) operates at an elevated pressure, some or all of the steam may be injected into the gas turbine expander 46 to boost its power output, or alternatively to a steam expander (not shown). The SOFC power plant can therefore have a combined cycle (gas turbine and bottoming steam cycle) heat recovery strategy, thermally integrated with the SOFC and with fuel processing.

Figure 14:
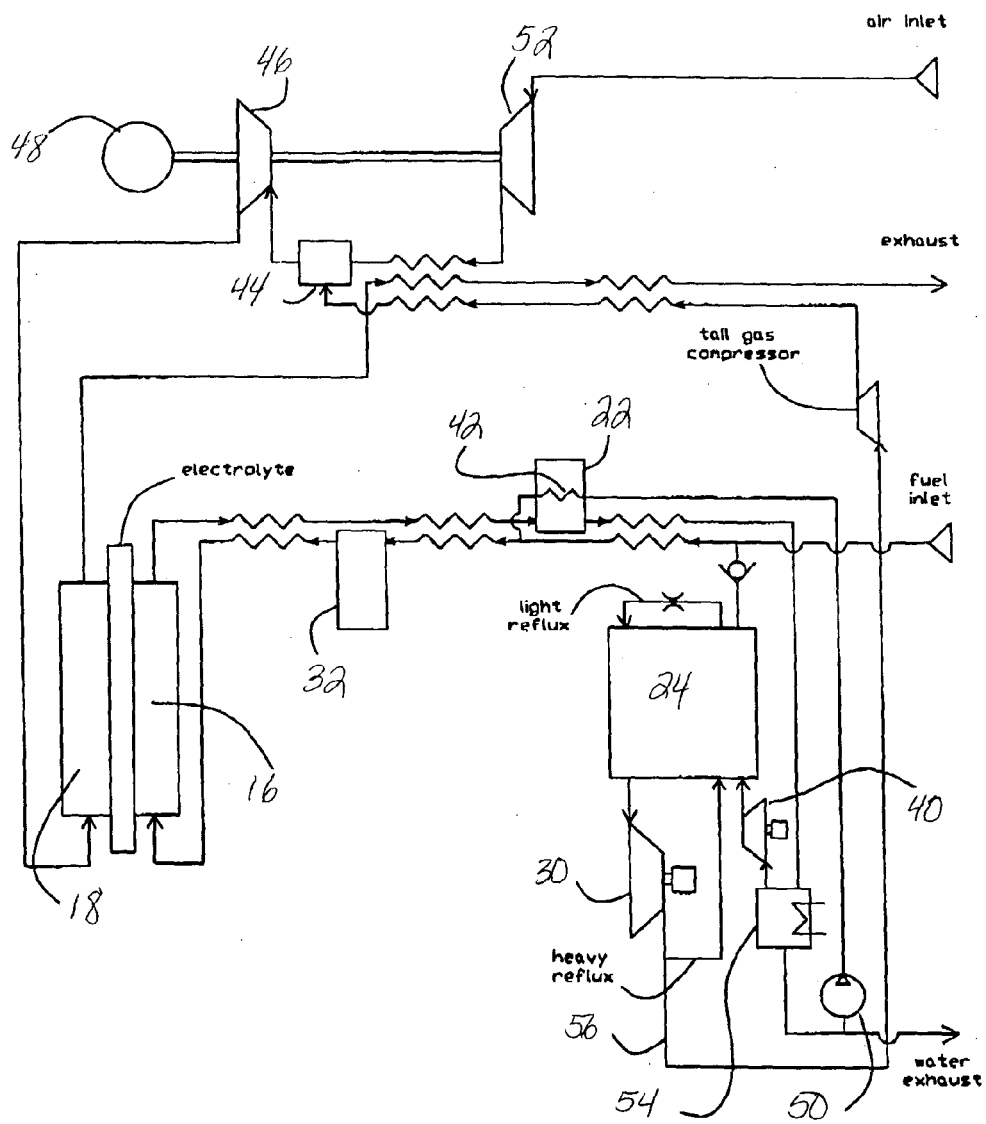
Figure 16:
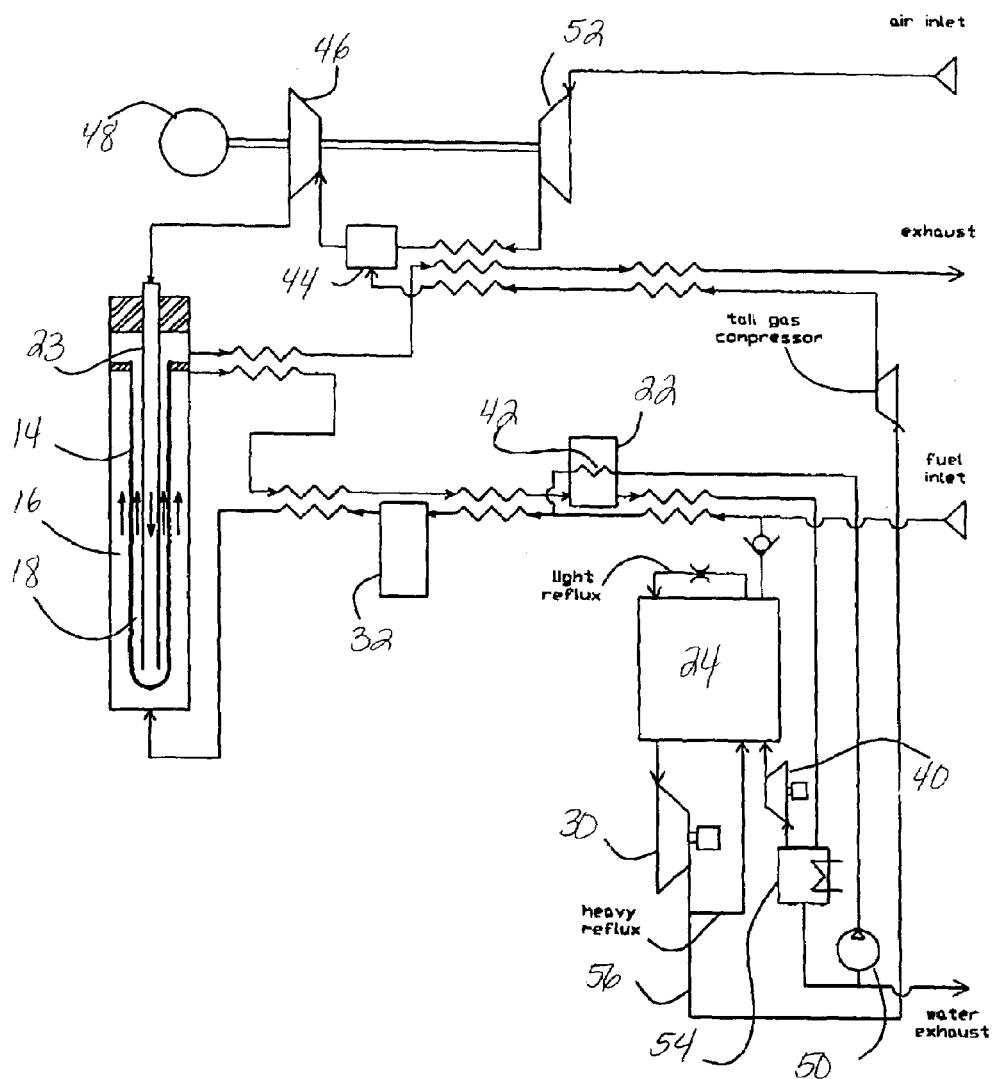

In FIGS. 14 and 16, the PSA tail gas 56 (heavy product) is compressed to the working pressure of the gas turbine 46, and is combusted within the gas turbine 46 in a burner 44 internally heating the air (already preheated by recuperation from the SOFC cathode exhaust) immediately prior to turbine entry. This strategy improves the attainable gas turbine power output and efficiency (owing to more elevated turbine entry temperature), and importantly also reduces the maximum working temperature required from the gas turbine recuperative heater. However, the oxygen concentration delivered to the SOFC cathode inlet is reduced by approximately 2%, owing to the minor consumption of oxygen by the gas turbine burner 44 and the also minor dilution of the air by carbon dioxide and water vapour.

It will be apparent that the arrangement of FIGS. 14 and 16 is highly suitable for MCFC applications, since $CO_2$ is recovered from the anode exhaust and may be transferred to the cathode inlet as required for successful MCFC operation. Accordingly, these embodiments may be used for SOFC power plants, but are more preferred for MCFC fuel cell power plants.

FIGS. 15 and 16 show applications to a cathode supported tubular SOFC configuration, with air supplied to the cathode within the SOFC tube by an injector tube. A seal is provided to maintain separation between the cathode and anode exhaust streams, so that the anode exhaust may be used for PSA processing to capture $CO_2$ and recycle hydrogen.

Figure 17:
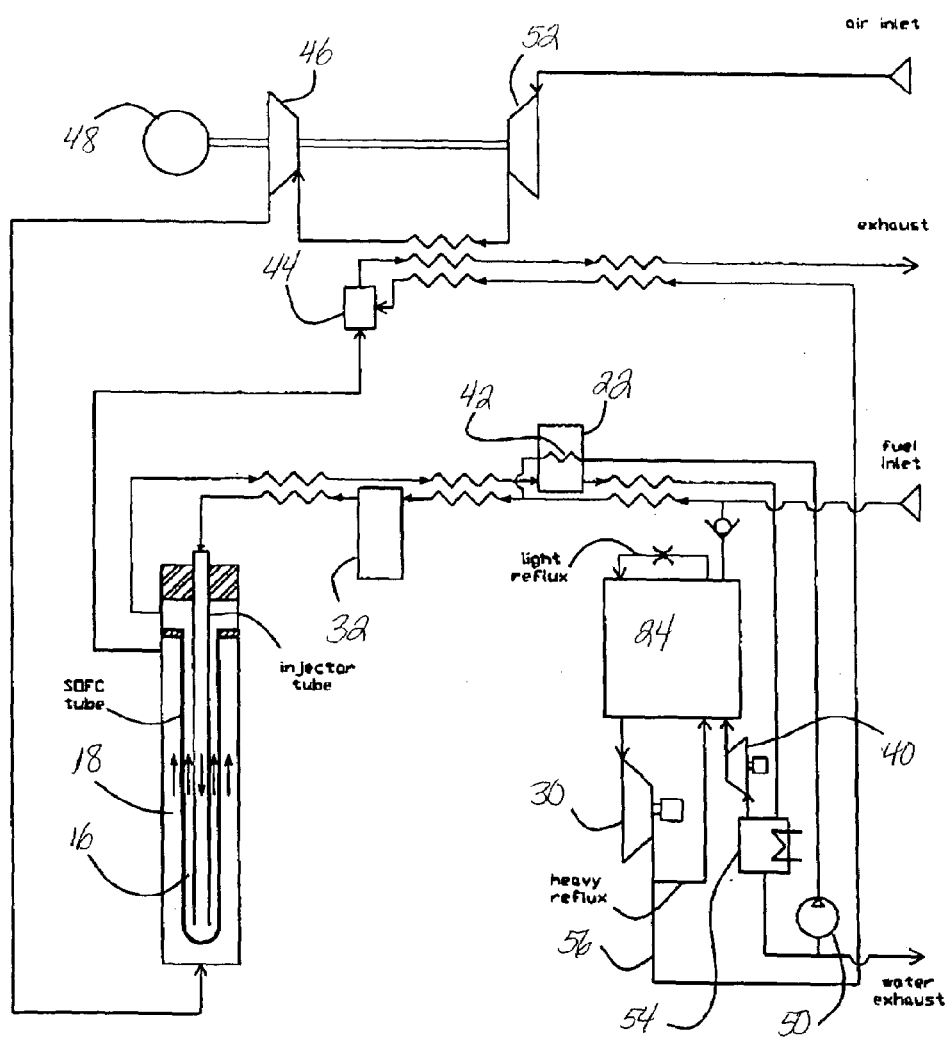

FIG. 17 shows an example of an anode supported SOFC configuration, with the anode inlet supplied within the SOFC tube by an injector tube.

It may be noted that the single stage PSA of the above embodiments cannot readily achieve very high $CO_2$ concentration in the heavy product. High $CO_2$ concentration achieved by the single stage PSA would result in tail gas of very low BTU value, unsuitable for reheating and combustion to augment the gas turbine power output. A further serious problem arises from nitrogen accumulation in the anode recycle loop. Nitrogen is typically introduced as a minor component of natural gas. While the PSA can readily remove nitrogen from hydrogen, it could only achieve relatively low recovery of other fuel values (e.g. carbon monoxide and methane) if operated to restrict nitrogen accumulations by allowing nitrogen to exit with the heavy product. Attainable SOFC fuel utilization would thus be limited by loss of some fuel components to the tail gas exhaust, with that calorific value to be recovered at lower efficiency by tail gas combustion in the burner.

Performance of the single stage PSA can be improved by using the cycle illustrated in the diagram of FIG. 11. A vent gas is released from the second valve face at an intermediate cycle pressure during the last step of cocurrent blowdown. This vent gas will purge nitrogen from the anode loop, while also providing a relatively high BTU fuel stream for the burner, as the vent gas will be much lower in $CO_2$ concentration than the heavy product delivered from the first valve face.

Figure 18:
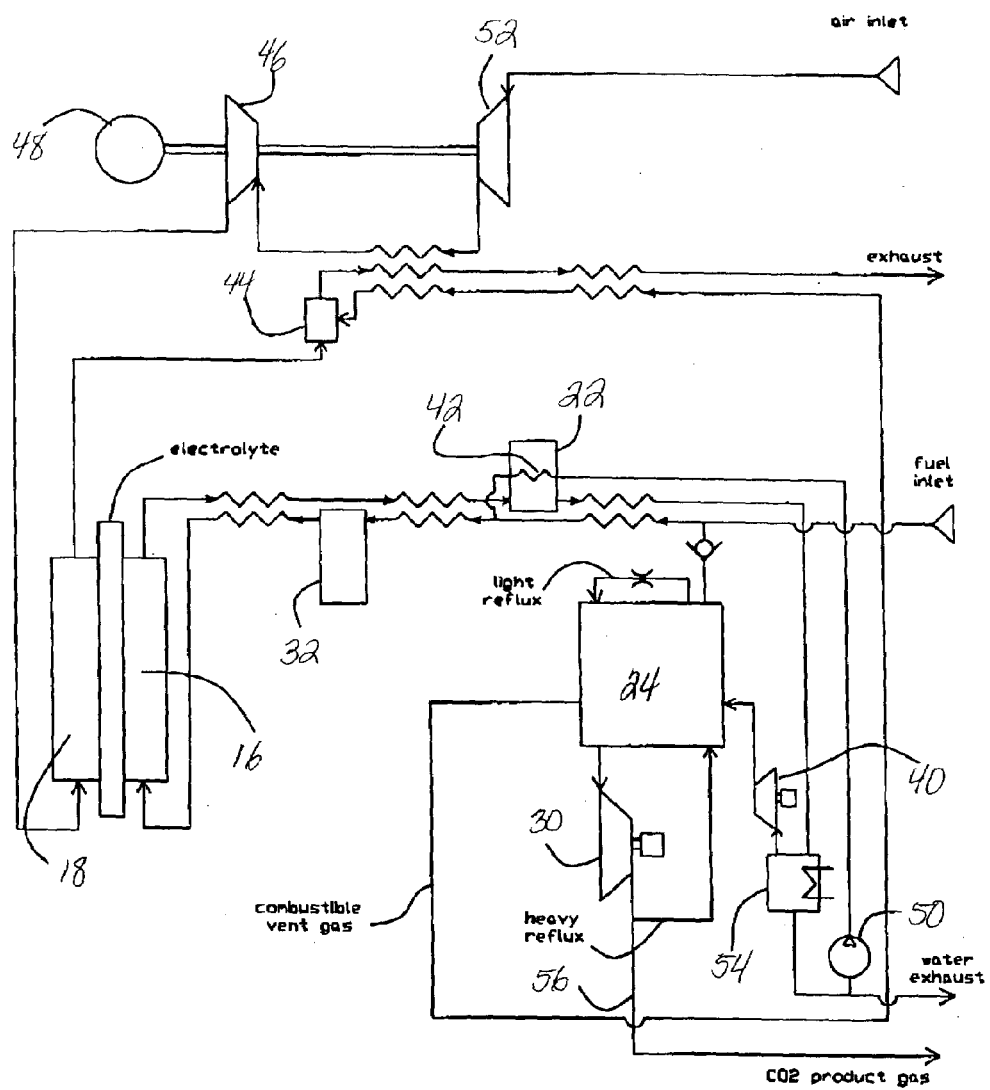
Figure 19:
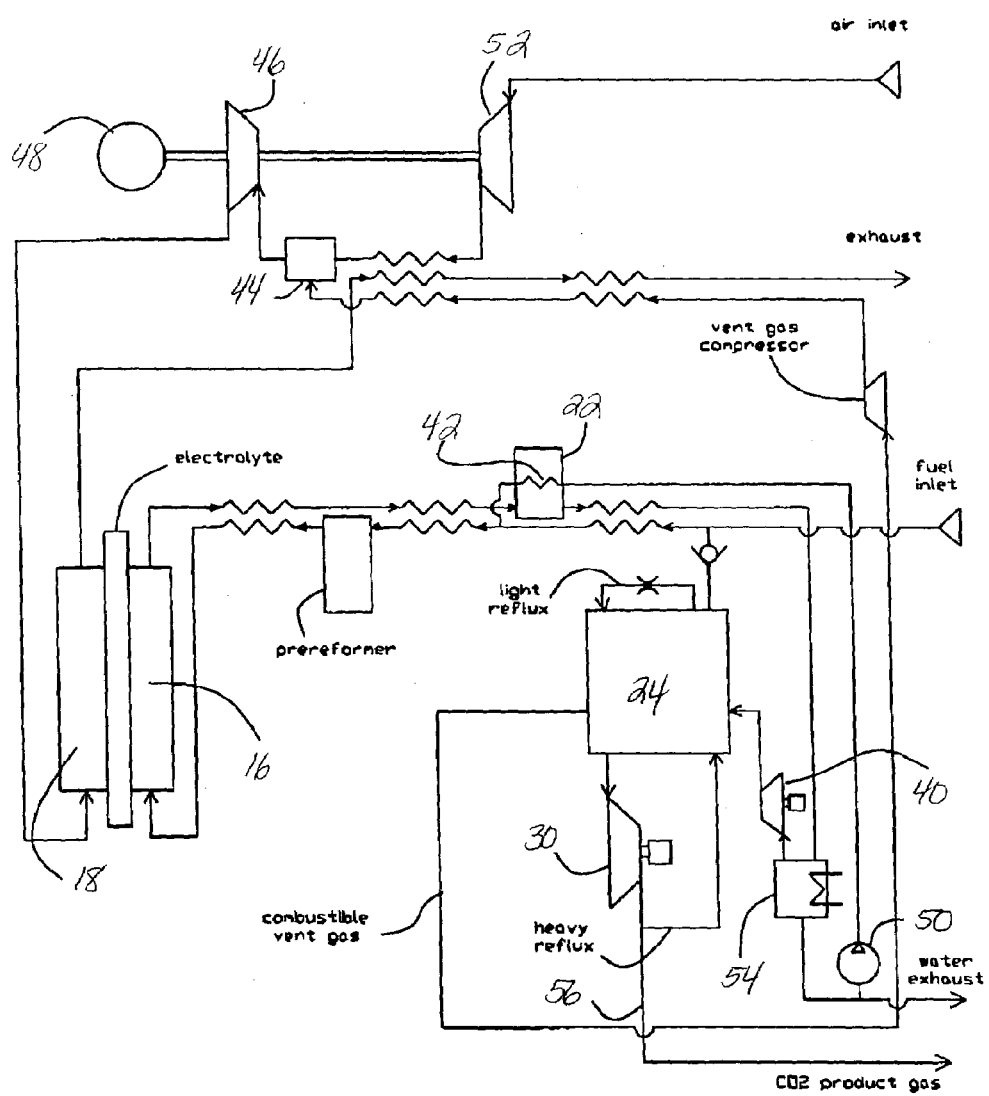

FIGS. 18 and 19

FIGS. 18 and 19 show simplified schematics of alternative SOFC power plant embodiments, with the SOFC working at substantially atmospheric pressure, using an indirect externally heated gas turbine 46 for heat recovery, but now using a two stage vacuum PSA (VPSA) as the fuel PSA. The simplified schematic of FIG. 6 is used to illustrate the two stage PSA in FIGS. 20-24, which may use specific two stage PSA embodiments such as those of either FIG. 7 or FIG. 9 to execute a PSA cycle such as that shown in FIG. 12.

The two-stage PSA configuration has several important advantages, as follows. The $CO_2$ enrichment stage reduces irreversibilities of the PSA process, resulting from large $CO_2$ concentration differences between the feed and the heavy reflux streams. Hydrogen recovery is enhanced for a given flow and power consumption of heavy reflux. Very high $CO_2$ concentration, up to essentially 100% purity, can readily be achieved if desired for $CO_2$ delivery as a valued by-product or alternatively for sequestration disposal.

A vent stream is released from between the PSA stages so that high performance in H2 purification and $CO_2$ concentration can be achieved simultaneously. This vent stream purges nitrogen from the anode recycle loop, while containing only a modest amount of $CO_2$ so the vent stream can be a relatively high BTU fuel for satisfactory use in the burner. As shown in the cycle diagram of FIG. 12, the vent gas is delivered at the higher pressure of the PSA cycle, being pushed by the heavy reflux feed step.

If desired, vent gas may also be released from the second valve face at an intermediate cycle pressure during the last step of cocurrent blowdown, as with the single stage PSA.

Figure 20:
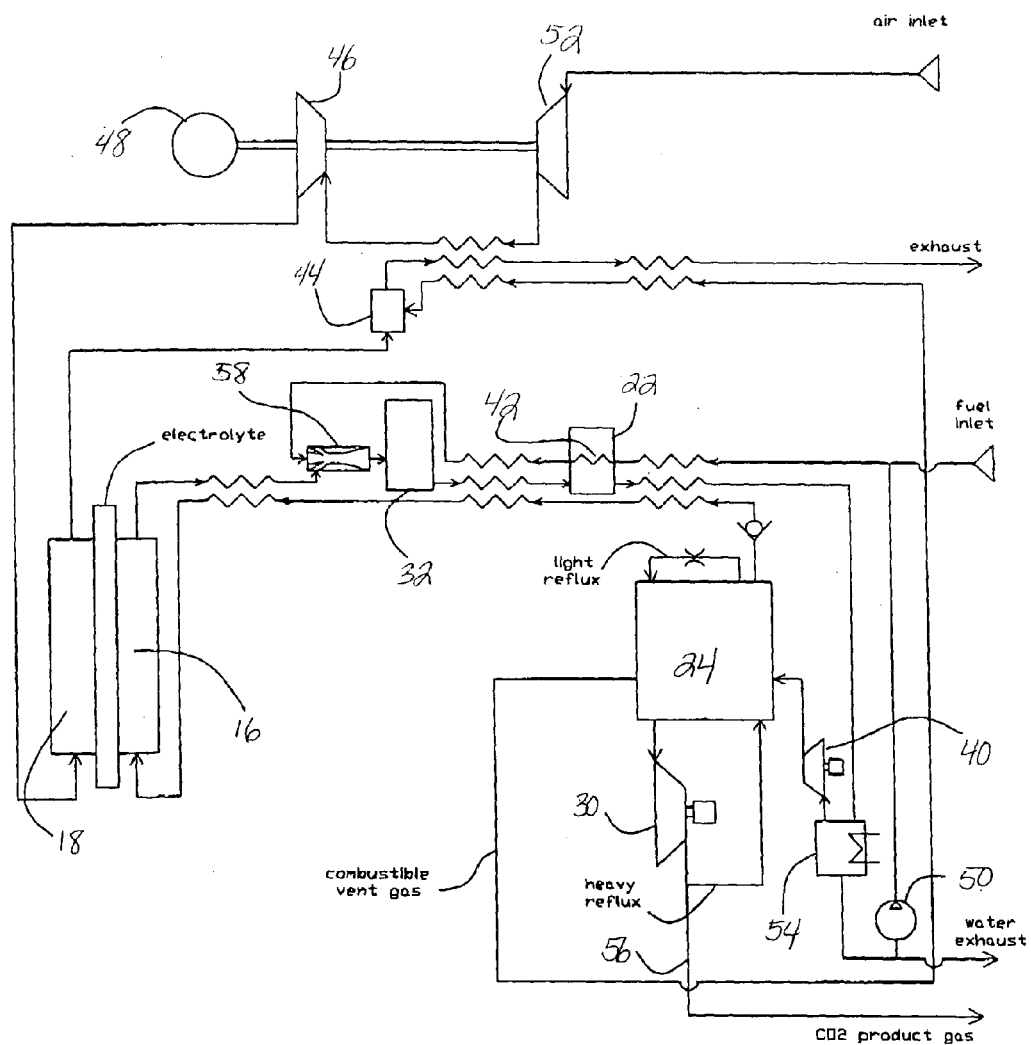
Figure 21:
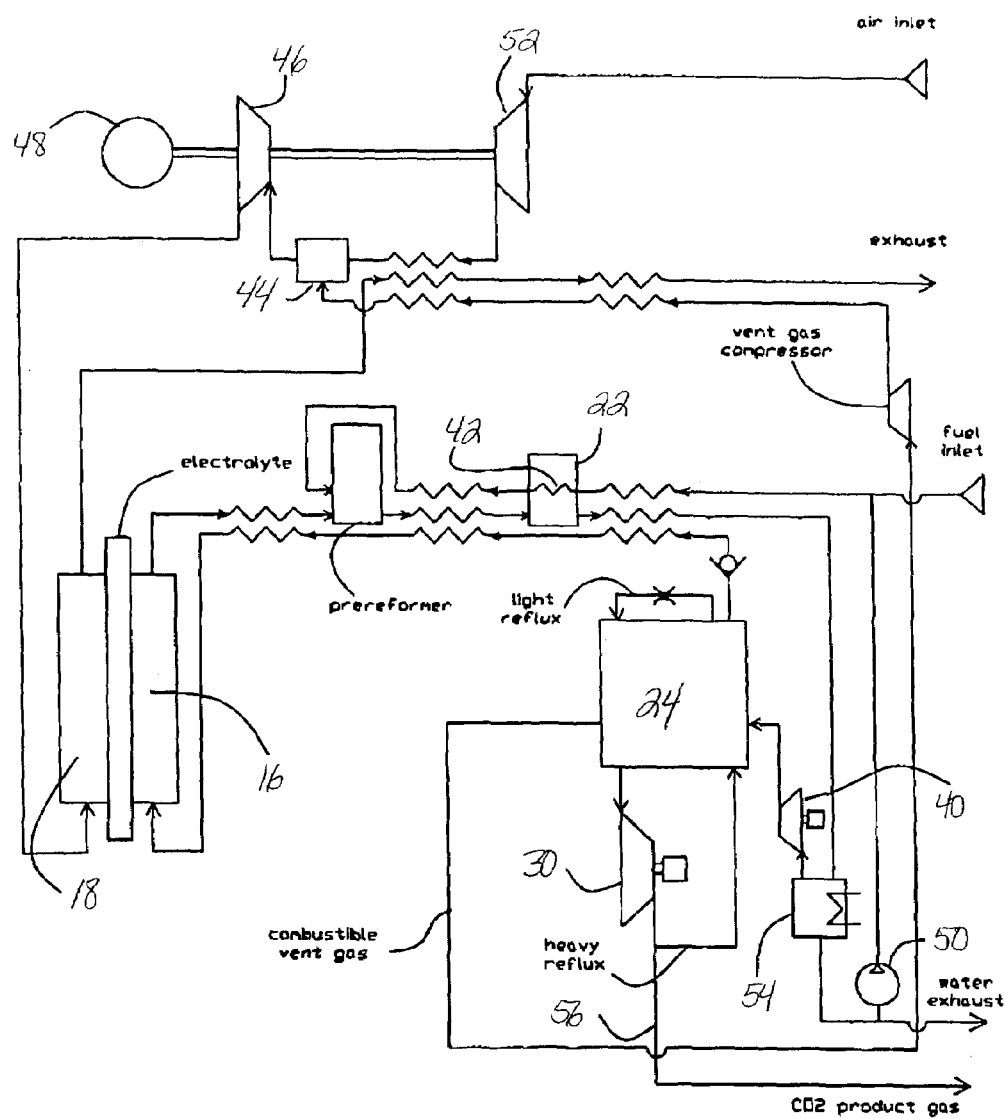

FIGS. 20 and 21

FIGS. 20 and 21 show simplified schematics of alternative SOFC power plant embodiments, with the SOFC working at substantially atmospheric pressure, using an indirect externally heated gas turbine 46 for heat recovery, and using a single stage vacuum PSA (VPSA) as the fuel gas separation means. Instead of delivering substantially purified hydrogen from the hydrogen PSA with fresh fuel and supplemental steam to the pre-reformer 32, these embodiments directly recycle the SOFC anode exhaust gas to the pre-reformer 32 together with makeup fuel. This advantageously captures the waste heat and steam from the SOFC anode exhaust to assist pre-reforming, which may be conducted at low temperature (about 500° C.) in order that the pre-reforming step is approximately isothermal.

Alternatively in these embodiments, the pre-reforming step may be conducted at an elevated temperature approaching that of the SOFC anode exhaust up to e.g. 1000° C., so that higher reaction rates will be achieved. The pre-reformer 32 at higher temperature would use a smaller catalyst inventory, while greater conversion to syngas may be achieved albeit in an adiabatic mode undergoing a substantial cooling of the anode gas stream being processed across the pre-reformer 32.

The PSA 24 may preferably now be working to remove $CO_2$ and some water vapour from the recycle fuel stream, rather than operating primarily to purify hydrogen. In that mode of operation, it may be attractive to operate the PSA 24 at a relatively elevated temperature, using adsorbents such as potassium carbonate modified alumina or hydrotalcite. Suitable such adsorbents may be chosen to selectively remove CO2 from humid gas streams. The hydrotalcite is selective for $CO_2$ over water vapour, so the light product gas recycled to the SOFC will contain enriched fuel values with sufficient water vapour for avoiding carbon deposition problems. The approach of operating at elevated temperature (up to about 400 to about 500° C. with hydrotalcite) facilitates good process thermal efficiency, and simplification by removal of some recuperative heat exchangers. The PSA unit 24 itself may operate as a regenerative heat exchanger, by maintaining the second valve face at a more elevated temperature and the first valve face at a less elevated temperature so that there is a temperature gradient along the flow path through the adsorbers. Furthermore, water gas shift catalyst (including any of the known high temperature, low temperature, or sulfur-tolerant water gas shift catalysts) may be included in a zone of the adsorbers so that the water gas shift reactor is integrated with the PSA unit. The adsorbent adjacent the first valve face may be chosen to be promoted hydrotalcite, so as to remove carbon dioxide away from the water gas shift catalyst zone. The adsorbent adjacent the second valve face may be alumina gel or a hydrophilic zeolite, so as to capture water vapour to be concentrated over the water gas shift catalyst FIG. 20 also illustrates use of an ejector 58 to drive or assist driving gas circulation around the anode recycle loop. The fuel is externally compressed to a driving pressure well in excess of the SOFC system working pressure. Water recycled from the condenser 54 is pressurized to the driving pressure by the water pump 50, and mixed with the fuel before recuperative preheating and steam generation in the HRSG 42, so that ample driving fluid and enthalpy is available for the ejector 58.

Figure 22:
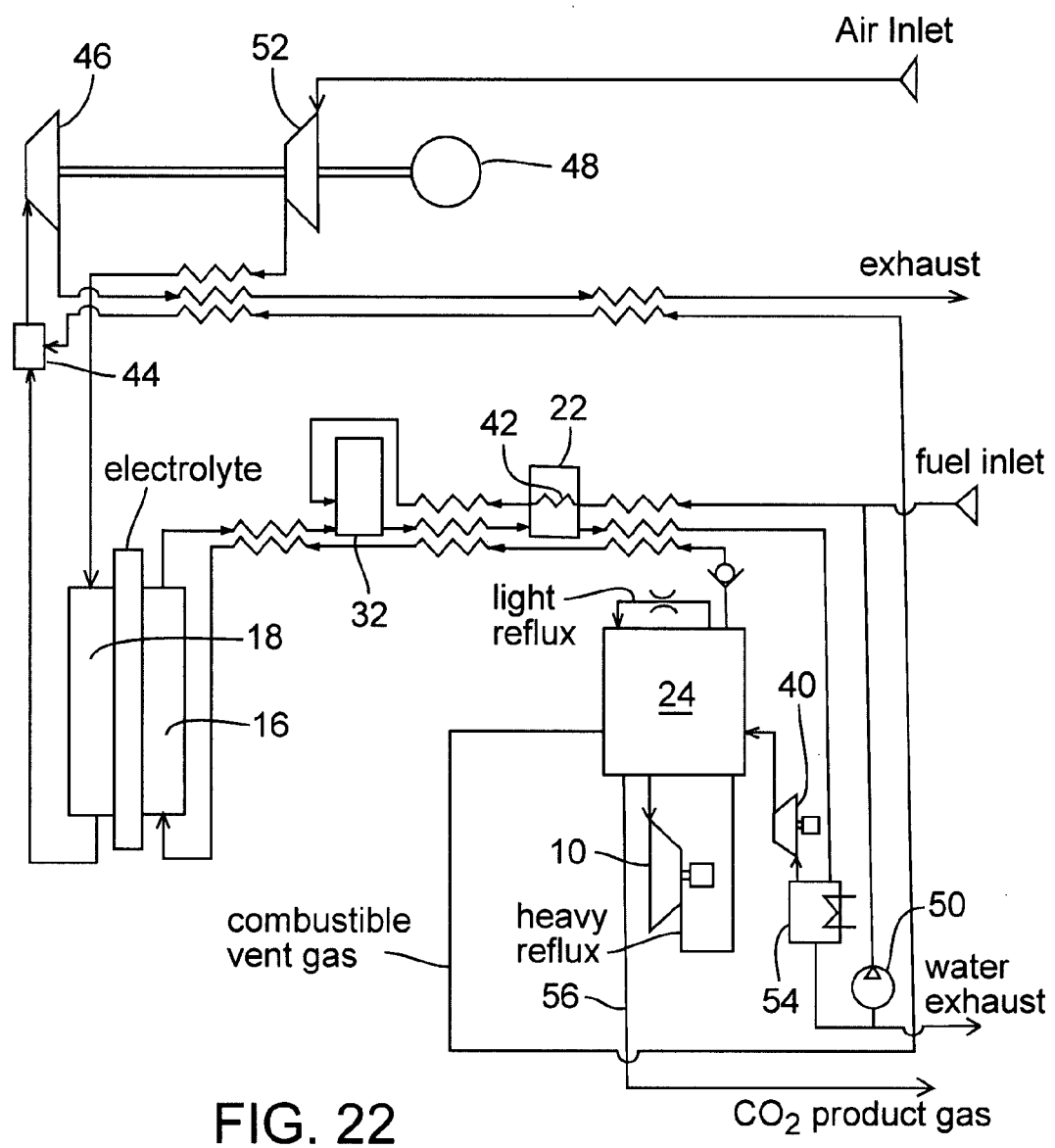
Figure 23:
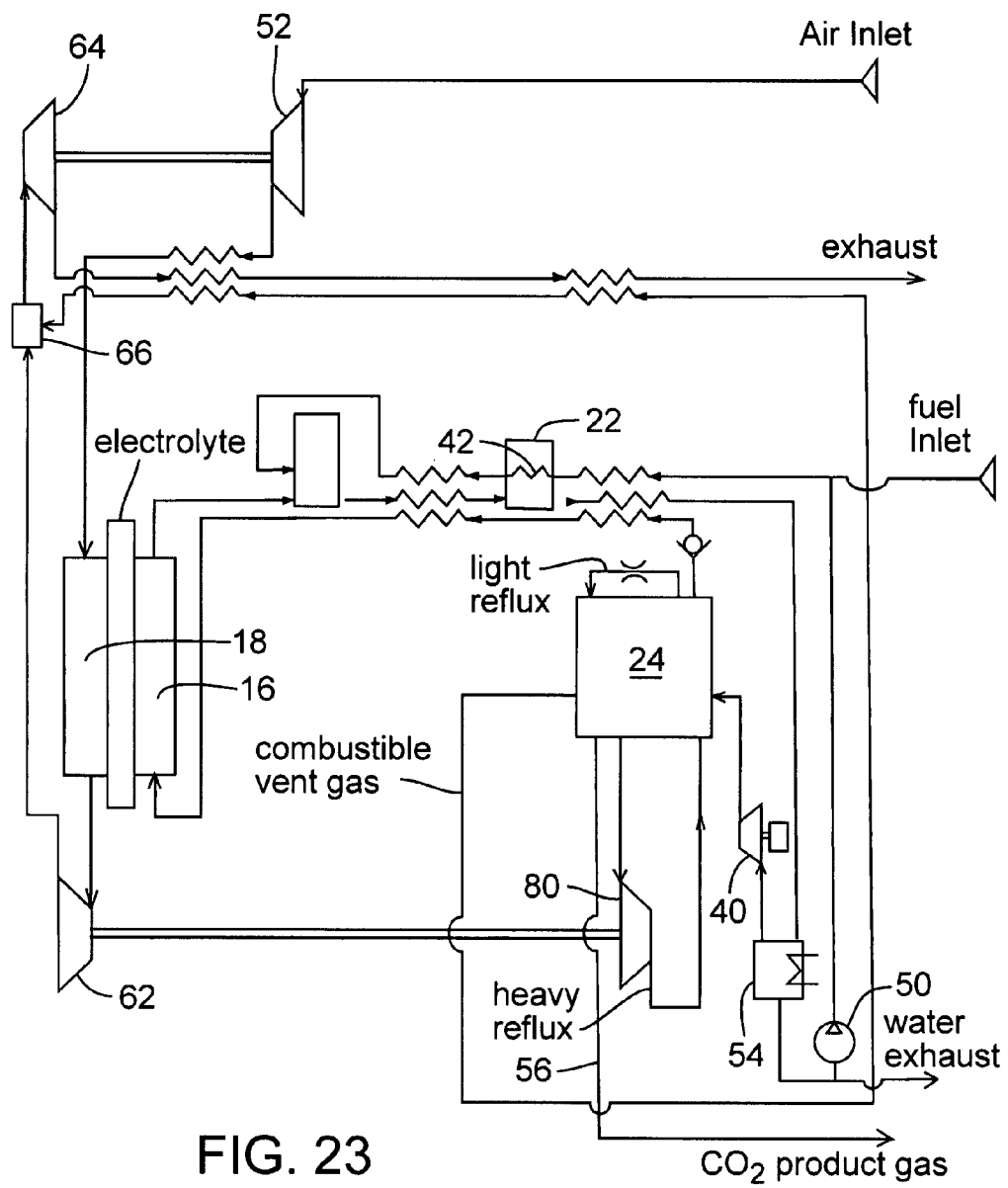

FIGS. 22 and 23

FIGS. 22 and 23 show simplified schematics of alternative SOFC power plant embodiments, with the SOFC working at elevated pressure while using a directly heated gas turbine 46 for heat recovery, and using a positive pressure PSA (VPSA) as the fuel PSA 24. Instead of delivering substantially purified hydrogen from the hydrogen PSA 24 with fresh fuel and supplemental steam to the pre-reformer 32, these embodiments directly recycle the SOFC anode exhaust gas to the pre-reformer 32 together with makeup fuel. This advantageously captures the waste heat and steam from the SOFC anode exhaust to assist pre-reforming or hydrogasification of the fuel. As before, pre-reforming could be conducted at low temperature (about 500° C.) in order that the pre-reforming step be approximately isothermal.

The working fluid of the gas turbine is the SOFC cathode air stream. The air is compressed and preheated by the recuperative gas turbine 46 before entering the cathode inlet, and the cathode exhaust gas is directly heated (or if desired indirectly heated) by the PSA tail gas burner before expansion in the turbine 46.

FIG. 22 illustrates a gas turbine 46 driving an electrical generator 48, while the heavy reflux compressor 60, recycle blower 70 and water pump 50 may be driven electrically. The gas turbine 46 could of course be mechanically coupled to any of those loads for higher efficiency and reduced capital cost.

FIG. 23 illustrates a twin spool gas turbine, with a first stage turbine 62 driving the heavy reflux compressor 60, while the second stage turbine 64 drives the feed air compressor 52 for the gas turbine and the SOFC. The tail gas burner 66 may provide reheat to the second stage turbine 64.

The pre-reformer 32 illustrated in FIGS. 22 and 23 (operating at relatively elevated temperature and pressure) could be a hydrogasification reformer suitable for methanation of higher hydrocarbon fuels such as diesel fuel, with a desirable thermal balance between exothermic hydrogasification and endothermic steam reforming. Hydrogen sulfide and carbon dioxide may be removed by the PSA 24, so that the SOFC (or MCFC) operates on a desirable fuel mixture of primarily hydrogen and methane. Particularly for a MCFC (whose typically working pressure may be atmospheric or at most a few atmospheres), the working pressure of the hydrogasification reactor would preferably be much higher than that of the fuel cell stack, so the hydrogasification section and PSA may be turbocharged to a relatively elevated pressure, with pressure letdown to the fuel cell stack by an energy recovery expander driving the turbocharger compressor.

FIG. 24

Figure 24:
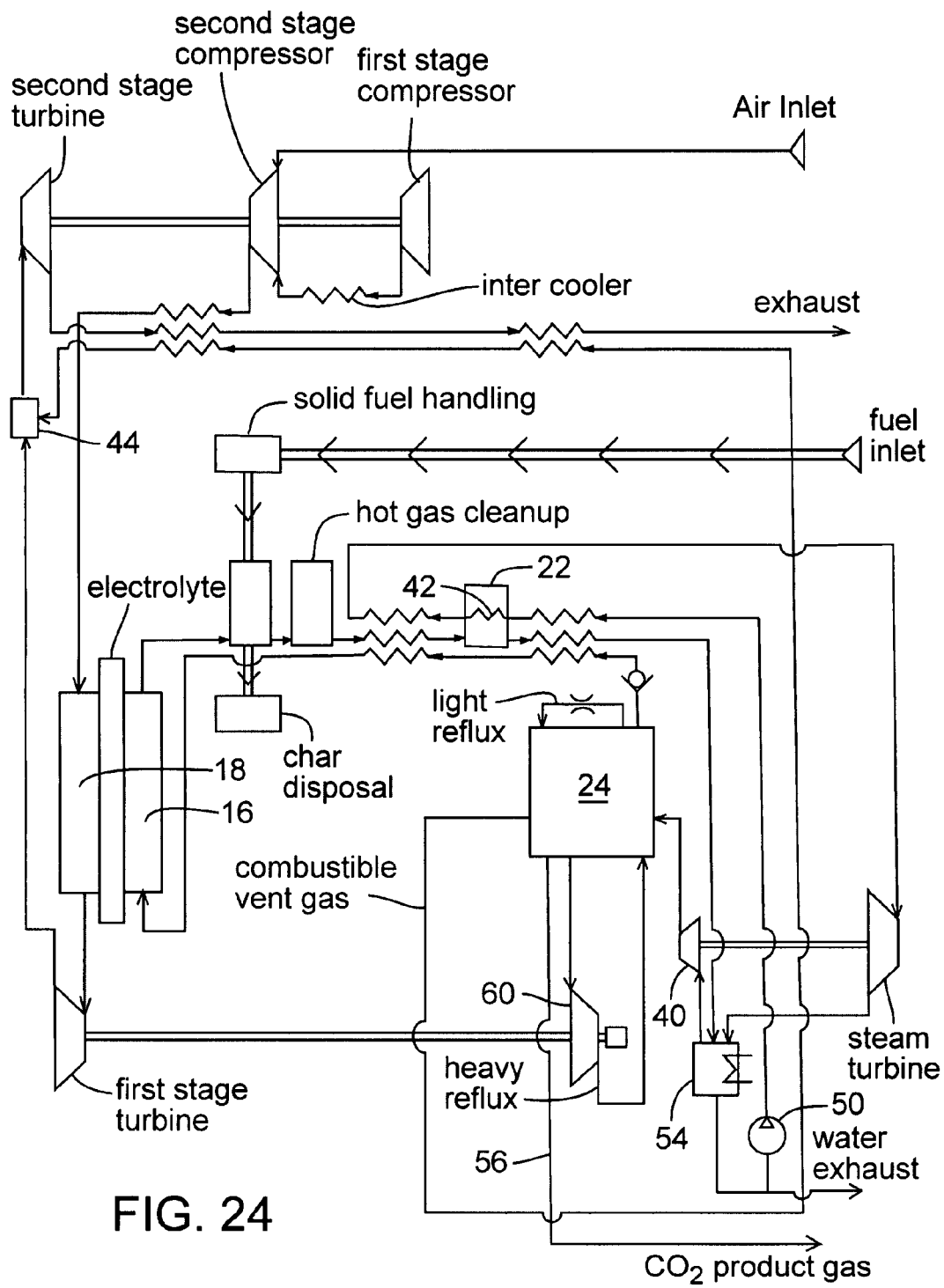

FIG. 24 shows a SOFC power plant integrated with hydrogasification of a solid fuel such as biomass or coal. The hydrogasifier 68 and the SOFC may desirably operate at high temperature and exceptionally high pressure in the typical range of about 20 to about 60 bars absolute. For hydrogasification of coal, relatively higher working pressures of about 60 bars have been used, while biomass hydrogasification has been practised successfully at about 30 bars. As discussed above, the hydrogasification and PSA section could be turbocharged if a lower working pressure of the SOFC is desired. Preferably the working pressures of the SOFC and hydrogasifier are substantially equal, and the anode exhaust gas (containing a large excess of recycled hydrogen as well as steam, CO and $CO_2$ with the waste heat generated by the SOFC) is delivered directly from the SOFC anode outlet to the hydrogasifier 68. The process gas delivered from the hydrogasifier 68 will be primarily methane together with residual hydrogen, CO, $CO_2$ and steam. This gas will typically also include some contaminant components such as H2S, and may also contain useful by-products such as benzene, toluene and xylene (BTX).

Specialized fuel handing equipment is provided to supply solid fuel to the hydrogasifier 68. Ash and char are removed to a suitable disposal system, which may be an air or oxygen blown steam gasifier delivering supplemental syngas to the same SOFC or another suitable application.

After hot gas clean-up to remove dust and other contaminants, the hydrogasifier product gas may be subjected to water gas shift over a sulfur-tolerant shift catalyst such those catalysts based on cobalt/molybdenum. The hydrogasifier product gas is then delivered to the PSA unit 24 for removal of $CO_2$, remaining H2S, any BTX aromatics, etc. The purified mixture of methane, hydrogen and some carbon monoxide is then fed to the SOFC anode inlet, preferably with some steam addition.

FIG. 24 shows the optional use of steam generated with heat recovery from the water gas shift reactor 22, and superheated by heat exchange with the hdyrogasifier process gas, to power a steam turbine 46, here used to drive the recycle blower 70 for the anode gas and hydrogasifier loop.

Figure 25:
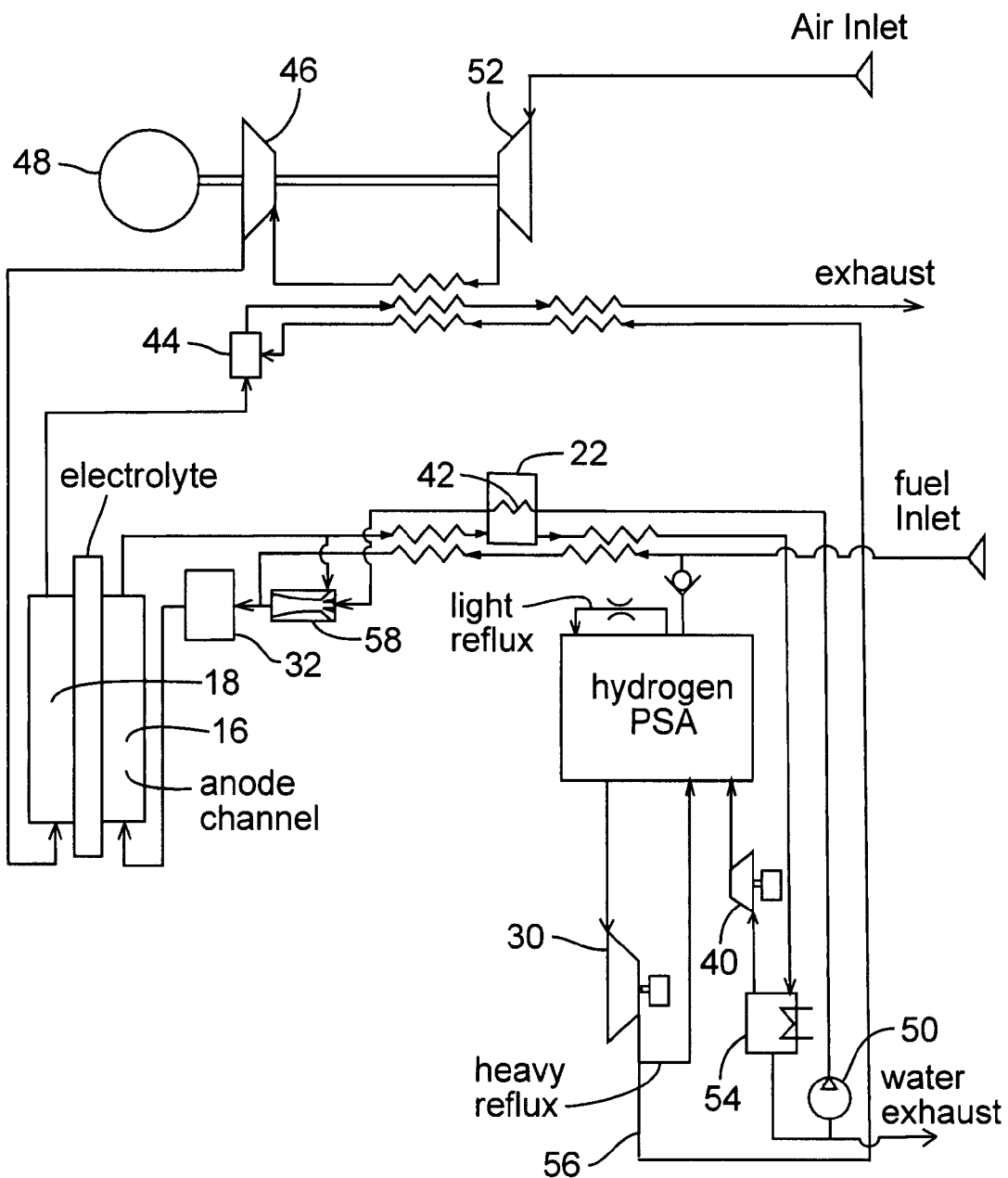

FIG. 25 shows a modification of the embodiment of FIG. 18, illustrating the use of an ejector 58 to drive internal recycle of anode exhaust gas, from the anode outlet back to the anode inlet through the pre-reformer 32. Such internal recycle implemented alone is known in the prior art, as particularly useful for recycle of SOFC product steam to maintain a satisfactory steam/carbon ratio within an internally reforming SOFC, however, in FIG. 25, the anode exhaust is inventively split between an internal recycle fraction to be recirculated directly to the pre-reformer 32 and thence to the anode inlet by the ejector 58, and an external fraction which will be processed by the water gas shift reactor 22 and the PSA unit 24 so that a hydrogen-enriched portion therefor may be recycled to the pre-reformer 32 and thence to the anode inlet. The ejector 58 is shown in this embodiment as driven by steam generated by a heat recovery steam generator 42 heated by the exothermic water gas shift reactor 32. Alternatively or in addition, steam may also be generated in a bottoming cycle by heat recovery from the cathode exhaust after initial heat recovery to the gas turbine. The steam generated by either or both the water gas shift reactor 22 and the cathode exhaust may be superheated to substantially the working temperature of the SOFC. It will be appreciated that steam may readily be generated by heat recovery (from even a low temperature water gas shift reactor operating at e.g. 300° C.) at an elevated pressure of e.g. 10 atmospheres, so that ample enthalpy is available to drive the ejector. The steam required for a typical steam/carbon ratio (of e.g. 2 to 3) is thus provided in part by internal recycle from the anode exhaust, and in part by heat recovery from the water gas shift reactor 22 which also provides driving power for recirculation by the ejector 58. The internal recycle also provides a benefit of recycling hydrogen, so that a smaller PSA unit 24 may be used to supply the enriched hydrogen recycle, with a correspondingly smaller heavy reflux compression power load. The water gas shift reactor 22 may have to be larger in the case of combined internal and external recycle, but this provides benefits of enhanced steam generation potential and enhanced SOFC cooling by internal reforming which will be more endothermic as a result of increased recycled $CO_2$ concentration in the anode channel 16 as a result of internal recycle.

Figure 26:
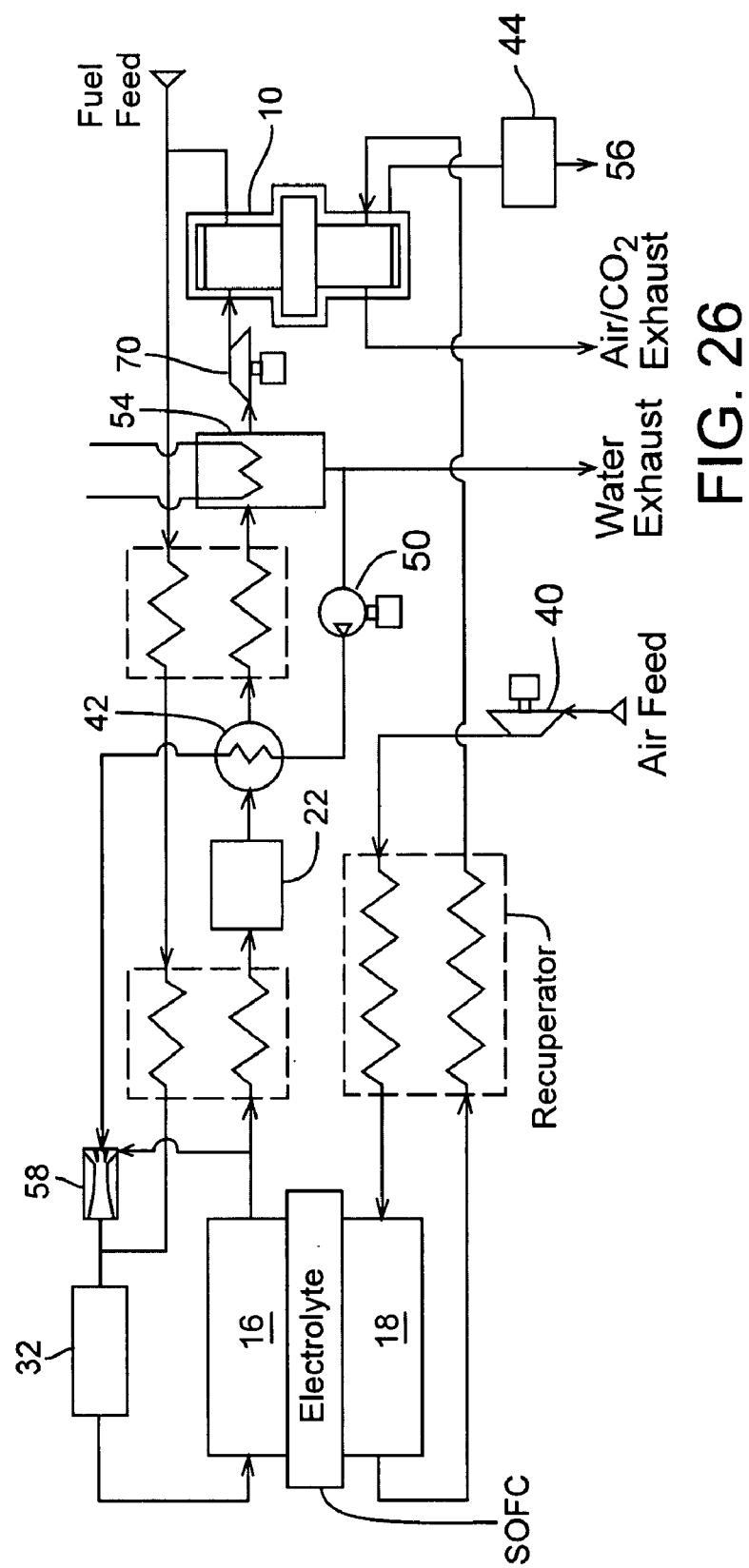

FIG. 26 shows a similar combination of internal recycle driven by a steam ejector 58, together with recycle of enriched hydrogen where the hydrogen has been enriched by a rotary adsorber module 10 regenerated by purging with cathode exhaust gas, wherein the driving fluid for the ejector 58 is again steam generated by heat recovery from the water gas shift reactor 22, with the steam derived from SOFC product water condensed from the anode exhaust gas and pressurized by the water pump 50.

Figure 27:
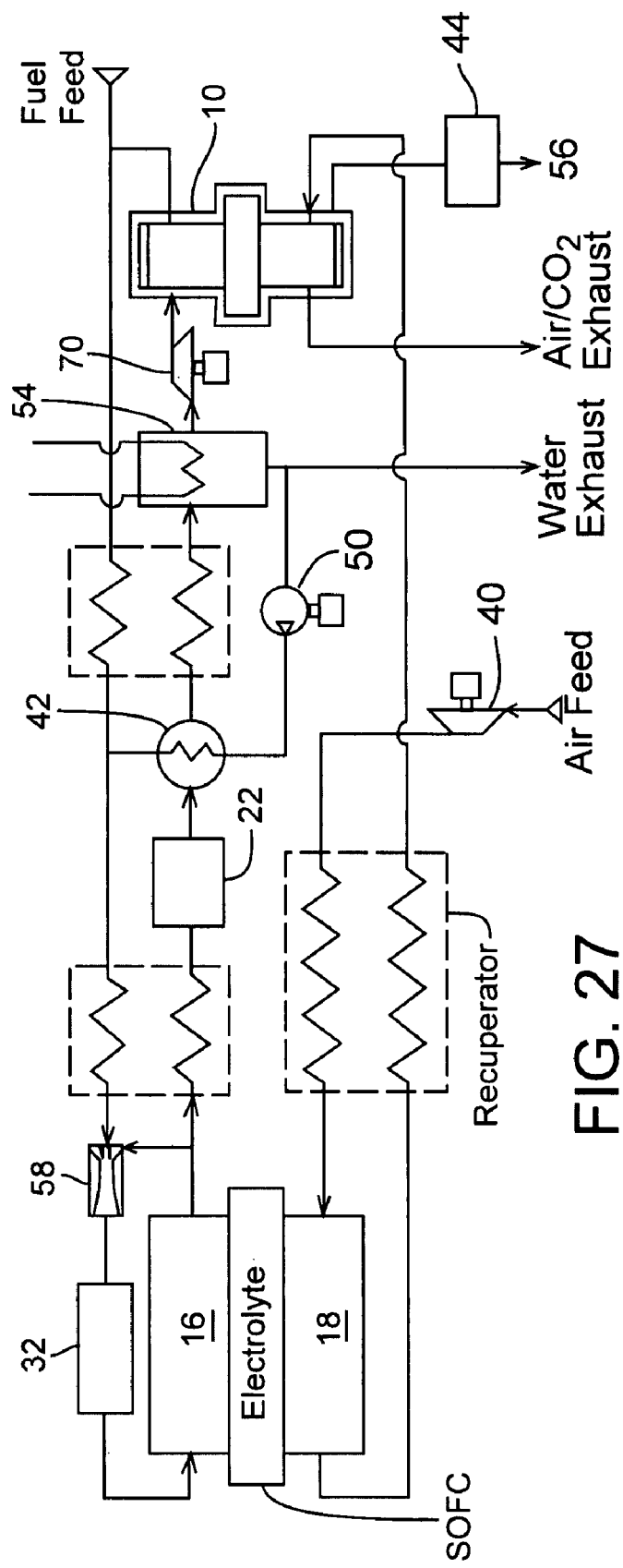

FIG. 27 illustrates a similar embodiment to FIG. 26, with the internal recycle ejector 58 here driven by the combined fuel and enriched hydrogen recycle from the rotary adsorption module 10. It will be appreciated that the fuel (e.g. natural gas) must be provided at a suitable feed pressure, while the recycle blower 70 will ensure that the enriched hydrogen recycle stream is also delivered from the rotary adsorption module 10 at substantially the same feed pressure, the feed pressure being sufficient to drive the ejector 58. In this embodiment, low pressure steam is blended with the hydrogen-enriched recycle stream to assist driving the ejector. As more low pressure steam could be generated by heat recovery from the cathode exhaust, the amount of steam to be contributed by internal recycle may be lower, in which case the internal recycle flow may also be relatively small so that the necessary feed pressure to the ejector nozzle may also be reduced It will be evident that there may be many other alternatives and variations of the disclosed systems and processes.

For SOFC power plants, the disclosed inventive systems and processes may enhance power generation performance by substantially increasing the ratio of hydrogen to steam partial pressure in the anode relative to the systems of the prior art. Estimated potential efficiencies based on fuel lower heating value may be in the range of about 65% to about 75% for natural gas fuelled fuel cell power plants. Also facilitated is cogeneration of efficiently generated electrical power, purified hydrogen, and low-grade waste heat suitable for building heating or domestic hot water utilities.

Having illustrated and described the principles of the disclosure with reference to several embodiments, it will be apparent to those of ordinary skill in the art that the disclosed systems, methods and apparatus may be modified in arrangement and detail without departing from such principles.

What is claimed is:

1. A high temperature fuel cell system comprising an anode channel, an anode inlet and an anode outlet, a first anode channel portion proximal to the anode inlet, a second anode channel portion proximal to the anode outlet, and a gas separation means operable to enrich a hydrogen gas component of an anode exhaust gas exiting the anode outlet to produce a first product gas enriched in the said hydrogen gas component such that at least a portion of the first product gas enriched in the hydrogen gas component can be provided as a portion of a fuel mixture supplied to the anode inlet, wherein;

the first anode channel portion comprises an anode material that is resistant to carbon deposition and active for direct oxidation of hydrogen, at least one hydrocarbon fuel or mixtures thereof;

the second anode channel portion comprises an anode material that is catalytically active for steam reforming of at least one hydrocarbon; and the fuel mixture comprises steam, hydrogen and optionally at least one hydrocarbon fuel, wherein steam and hydrogen are present in proportions of no more than 1.5 moles of steam per mole of hydrogen or the molar ratio of steam to hydrocarbon fuel in the mixture is no greater than 1.5 to 1.

2. The high temperature fuel cell system according to claim 1 wherein the high temperature fuel cell comprises a solid oxide fuel cell.

3. The high temperature fuel cell system according to claim 1 wherein the gas separation means comprises a rotary adsorption module containing an adsorbent material, and wherein the adsorbent material is capable of being periodically regenerated by means of pressure swing, temperature swing, displacement purge, or a combination thereof.

4. The high temperature fuel cell system according to claim 1, further comprising:

a cathode channel having a cathode inlet and a cathode outlet, a second gas separation means operable to produce from air a first product gas enriched in oxygen, and a catalytic partial oxidation means wherein said second gas separation means is fluidly connected to the cathode inlet such that the second gas separation means is capable of supplying at least a portion of the first oxygen-enriched product gas to the cathode inlet;

said catalytic partial oxidation means is fluidly connected to the cathode outlet such that the catalytic partial oxidation means is capable of receiving at least a portion of an exhaust gas from the cathode outlet for reaction with a hydrocarbon fuel mixture to produce a second product gas comprising syngas; and the system is configured such that at least a portion of said second product gas can be provided as a portion of a fuel gas mixture which is supplied to the anode inlet.

5. The high temperature fuel cell system according to claim 4, wherein the anode and cathode channels are arranged such that the fuel gas mixture in the anode channel is capable of flowing in a direction countercurrent to a flow of the oxygen-enriched gas in the cathode channel.

6. The high temperature fuel cell system according to claim 1, wherein the first anode channel portion comprises an anode material selected from $Cu/CeO_2/YSZ$, Cu-GDC, $Cu/Bi_2O_3$, $(La,Sr)(Ti,Ce)O_3$ or a mixture thereof, and the second anode channel portion comprises an anode material selected from Ni/YSZ, Ni/YDC, or NiGDC.

7. The high temperature fuel system according to claim 1, wherein the gas separation means comprises a pressure swing adsorption module.

8. A method of operating a fuel cell system, the fuel cell system comprising an anode channel, an anode inlet and an anode outlet, a first anode channel portion proximal to the anode inlet, a second anode channel portion proximal to the anode outlet, and a gas separation means, wherein the first anode channel portion comprises an anode material that is resistant to carbon deposition and active for direct oxidation of hydrogen, at least one hydrocarbon fuel or mixtures thereof, and the second anode channel portion comprises an anode material that is catalytically active for steam reforming of at least one hydrocarbon, the method comprising:

introducing an anode exhaust gas exiting the anode outlet into the gas separation means to produce a first product gas enriched in the a hydrogen gas component; and introducing the first product gas enriched in the hydrogen gas component as a portion of a fuel mixture supplied to the anode inlet, wherein the fuel mixture comprises steam, hydrogen and optionally at least one hydrocarbon fuel, wherein steam and hydrogen are present in proportions of no more than 1.5 moles of steam per mole of hydrogen or the molar ratio of steam to hydrocarbon fuel in the mixture is no greater than 1.5 to 1.

* * * * *